(12) United States Patent
Serrano et al.

(10) Patent No.: US 11,421,613 B2
(45) Date of Patent: Aug. 23, 2022

(54) MOTOR TORQUE SMOOTHING ON COMBUSTION ENGINES BY APPROXIMATING A PERIODIC WAVEFORM USING SINUSOIDS

(71) Applicant: Tula Technology, Inc., San Jose, CA (US)

(72) Inventors: Louis Joseph Serrano, Los Gatos, CA (US); Vijay Srinivasan, Farmington Hills, MI (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/466,888

(22) Filed: Sep. 3, 2021

(65) Prior Publication Data

US 2022/0205399 A1    Jun. 30, 2022

Related U.S. Application Data

(63) Continuation of application No. 17/138,116, filed on Dec. 30, 2020, now Pat. No. 11,143,125.

(51) Int. Cl.
| | |
|---|---|
| *F02D 41/00* | (2006.01) |
| *F02D 17/02* | (2006.01) |
| *F02D 41/30* | (2006.01) |

(52) U.S. Cl.
CPC ......... *F02D 41/0087* (2013.01); *F02D 17/02* (2013.01); *F02D 41/0002* (2013.01); *F02D 41/3058* (2013.01); *F02D 2041/0012* (2013.01); *F02D 2200/101* (2013.01); *F02D 2250/18* (2013.01)

(58) Field of Classification Search
CPC ............. F02D 41/0087; F02D 41/0002; F02D 41/3058; F02D 17/02; F02D 2200/101; F02D 2250/18; F02D 2041/0012
See application file for complete search history.

(56) References Cited

U.S. PATENT DOCUMENTS

| | | |
|---|---|---|
| 9,512,794 B2 | 12/2016 | Serrano et al. |
| 10,060,368 B2 | 8/2018 | Pirjaberi et al. |

(Continued)

OTHER PUBLICATIONS

International Search Report and Written Opinon from related PCT Application No. PCT/US2021/049134, dated Sep. 24, 2021, 6 pages.

*Primary Examiner* — George C Jin
(74) *Attorney, Agent, or Firm* — Brooks, Cameron & Huebsch, PLLC

(57) ABSTRACT

Methods, systems, and devices for operating an internal combustion engine at a firing fraction that is less than a value of 1.0, wherein one or more cylinders of the internal combustion engine are not designated to be fired, determining a smoothing event time period where a particular one of the cylinders that have not been designated to be fired is either skipped or recharged, selecting a periodic disruptive waveform to approximate that is related to a skip or recharge event that is part of the smoothing event time period, determining a first harmonic sinusoid from a group of harmonic sinusoids that reduces the error between an approximated waveform and the disruptive waveform, determining a timeframe for utilizing the first harmonic, and actuating an additional motor to initiate a supplemental quantity of torque during the smoothing event time period based on the disruption quantity of torque.

20 Claims, 19 Drawing Sheets

(56) References Cited

U.S. PATENT DOCUMENTS

| | | |
|---|---|---|
| 2013/0066502 A1 | 3/2013 | Yuille et al. |
| 2013/0092127 A1 | 4/2013 | Pirjaberi et al. |
| 2014/0041630 A1 | 2/2014 | Carlson et al. |
| 2016/0053697 A1 | 2/2016 | Pirjaberi et al. |
| 2016/0201586 A1* | 7/2016 | Serrano ............... F02D 41/1498 701/111 |
| 2018/0202379 A1 | 7/2018 | Nagashima et al. |
| 2019/0248221 A1 | 8/2019 | Serrano et al. |

* cited by examiner

| CYLINDER | 1 | 2 | 3 | 4 | 5 | 6 |
|---|---|---|---|---|---|---|
| CYCLE 1 | 1 | -1 | 1 | 0 | 1 | 0 |
| 2 | 1 | 0 | 1 | 0 | 1 | 0 |
| 3 | 1 | 0 | 1 | 0 | 1 | 0 |
| 4 | 1 | 0 | 1 | 0 | 1 | 0 |
| 5 | 1 | 0 | 1 | 0 | 1 | 0 |
| 6 | 1 | 0 | 1 | 0 | 1 | 0 |
| 7 | 1 | 0 | 1 | 0 | 1 | -1 |
| 8 | 1 | 0 | 1 | 0 | 1 | 0 |
| 9 | 1 | 0 | 1 | 0 | 1 | 0 |
| 10 | 1 | 0 | 1 | 0 | 1 | 0 |
| 11 | 1 | 0 | 1 | 0 | 1 | 0 |
| 12 | 1 | 0 | 1 | 0 | 1 | 0 |
| 13 | 1 | 0 | 1 | 0 | 1 | 0 |
| 14 | 1 | 0 | 1 | -1 | 1 | 0 |
| 15 | 1 | 0 | 1 | 0 | 1 | 0 |
| 16 | 1 | 0 | 1 | 0 | 1 | 0 |
| 17 | 1 | 0 | 1 | 0 | 1 | 0 |
| 18 | 1 | 0 | 1 | 0 | 1 | 0 |
| 19 | 1 | 0 | 1 | 0 | 1 | 0 |
| 20 | 1 | 0 | 1 | 0 | 1 | 0 |
| 21 | 1 | -1 | 1 | 0 | 1 | 0 |
| 22 | 1 | 0 | 1 | 0 | 1 | 0 |
| 23 | 1 | 0 | 1 | 0 | 1 | 0 |
| 24 | 1 | 0 | 1 | 0 | 1 | 0 |
| 25 | 1 | 0 | 1 | 0 | 1 | 0 |
| 26 | 1 | 0 | 1 | 0 | 1 | 0 |
| 27 | 1 | 0 | 1 | 0 | 1 | -1 |
| 28 | 1 | 0 | 1 | 0 | 1 | 0 |
| 29 | 1 | 0 | 1 | 0 | 1 | 0 |
| 30 | 1 | 0 | 1 | 0 | 1 | 0 |
| 31 | 1 | 0 | 1 | 0 | 1 | 0 |
| 32 | 1 | 0 | 1 | 0 | 1 | 0 |
| 33 | 1 | 0 | 1 | 0 | 1 | 0 |
| 34 | 1 | 0 | 1 | -1 | 1 | 0 |
| 35 | 1 | 0 | 1 | 0 | 1 | 0 |
| 36 | 1 | 0 | 1 | 0 | 1 | 0 |
| 37 | 1 | 0 | 1 | 0 | 1 | 0 |
| 38 | 1 | 0 | 1 | 0 | 1 | 0 |
| 39 | 1 | 0 | 1 | 0 | 1 | 0 |
| 40 | 1 | 0 | 1 | 0 | 1 | 0 |
| 41 | 1 | -1 | 1 | 0 | 1 | 0 |
| 42 | 1 | 0 | 1 | 0 | 1 | 0 |
| 43 | 1 | 0 | 1 | 0 | 1 | 0 |
| 44 | 1 | 0 | 1 | 0 | 1 | 0 |
| 45 | 1 | 0 | 1 | 0 | 1 | 0 |
| 46 | 1 | 0 | 1 | 0 | 1 | 0 |
| 47 | 1 | 0 | 1 | 0 | 1 | -1 |
| 48 | 1 | 0 | 1 | 0 | 1 | 0 |
| 49 | 1 | 0 | 1 | 0 | 1 | 0 |
| 50 | 1 | 0 | 1 | 0 | 1 | 0 |
| 51 | 1 | 0 | 1 | 0 | 1 | 0 |
| 52 | 1 | 0 | 1 | 0 | 1 | 0 |
| 53 | 1 | 0 | 1 | 0 | 1 | 0 |
| 54 | 1 | 0 | 1 | -1 | 1 | 0 |
| 55 | 1 | 0 | 1 | 0 | 1 | 0 |
| 56 | 1 | 0 | 1 | 0 | 1 | 0 |
| 57 | 1 | 0 | 1 | 0 | 1 | 0 |
| 58 | 1 | 0 | 1 | 0 | 1 | 0 |
| 59 | 1 | 0 | 1 | 0 | 1 | 0 |
| 60 | 1 | 0 | 1 | 0 | 1 | 0 |

MOTOR TORQUE SMOOTHING ON COMBUSTION ENGINES BY APPROXIMATING A PERIODIC WAVEFORM USING SINUSOIDS

PRIORITY INFORMATION

This application is a Continuation of U.S. application Ser. No. 17/138,116, filed Dec. 30, 2020, the contents of which are incorporated herein by reference.

TECHNICAL FIELD

The present disclosure relates to combustion engine management methods, devices, and systems and, in particular, to motor torque smoothing on combustion engines by approximating a periodic waveform using sinusoids.

BACKGROUND

Fuel efficiency of internal combustion engines can be substantially improved by varying the displacement of the engine. This allows for the full torque to be available when needed yet can significantly reduce pumping losses and improve thermal efficiency by using a smaller displacement when full torque is not needed. Engines that use these techniques are generally referred to as variable displacement engines.

One engine control approach that varies the effective displacement of an engine is referred to as "skip-fire" engine control. In general, skip-fire engine control contemplates selectively skipping the firing of certain cylinders during selected firing opportunities. Thus, a particular cylinder may be fired during one engine cycle, skipped during the next engine cycle, and then selectively skipped or fired during the next. In some implementations, the decision to skip or fire a cylinder can be made dynamically at each firing opportunity.

Further, in some implementations, when a cylinder is skipped, air/exhaust gas can remain in the cylinder. This can be beneficial for a number of reasons. For example, the air/gas can act as a barrier to keep oil from leaking past the piston rings and into the cylinder chamber. Such leakage can increase oil consumption and wear on the engine, among other issues.

Over time, if the cylinder is repeatedly skipped, the air/gas can leak out past the piston rings, leaving an inadequate amount of air/gas in the cylinder. In such a situation, the cylinder will need to be recharged with new air. During the compression cycle of a cylinder being skipped, the compression of the residual gases creates a torque that slows the engine. In contrast, on a subsequent expansion stroke the energy in the compressed gases is returned, speeding the engine.

Such skip events and recharging events cause fluctuations in engine speed. Specifically, such skip events and recharging events cause torque fluctuations that create undesirable noise, vibration, and harshness (NVH) (e.g., vibration) and can be objectionable to an occupant of the vehicle.

BRIEF DESCRIPTION OF THE DRAWINGS

FIG. 4 is a graph showing an example of skip, fire, and recharging event selections for an internal combustion engine that may be used with embodiments of the present disclosure.

DETAILED DESCRIPTION

Figure 1:
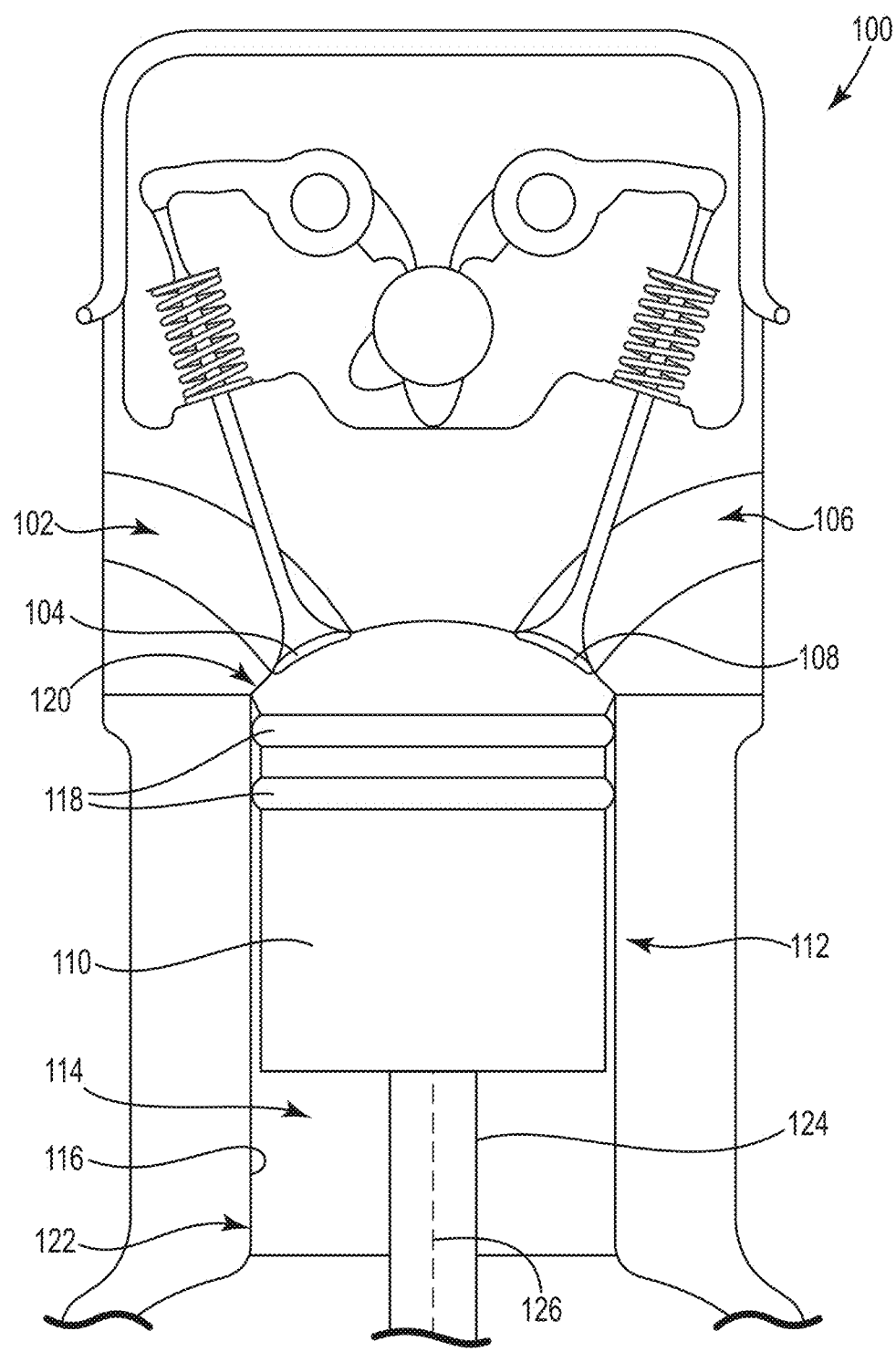
FIG. 1 is a schematic diagram of a representative engine cylinder and valve system for an internal combustion engine for use with embodiments of the present disclosure.

As discussed above, methods, systems, and devices for combustion engine management for internal combustion engines using skip-fire technology are described herein. Such embodiments can determine a torque profile of the skip-fire controlled engine for a number of skip or recharge events, and an additional source of power can be used to smooth the torque profile.

For example, one embodiment includes operating an internal combustion engine at a firing fraction that is less than a value of 1.0, wherein one or more cylinders of the internal combustion engine are not designated to be fired, determining a smoothing event time period where a particular one of the cylinders that have not been designated to be fired is either skipped or recharged, selecting a periodic disruptive waveform to approximate that is related to a skip or recharge event that is part of the smoothing event time period, determining a first harmonic sinusoid from a group of harmonic sinusoids that reduces the error between an approximated waveform and the disruptive waveform, determining a phase or timeframe for utilizing the first harmonic, and actuating an additional motor to initiate a supplemental quantity of torque during the smoothing event time period based on the disruption quantity of torque.

In various embodiments, the supplemental quantity of torque can include positive and/or negative torque values. The engine may be either a spark ignition or compression ignition engine. The internal combustion engine may, for example, be used to power a vehicle.

The described approaches are particularly suitable for use in hybrid vehicles in which the combustion engine is operated using a skip-fire or other variable displacement technique. In some embodiments, the vehicle includes a motor/generator that applies the smoothing torque but is not used as a hybrid engine.

Skip-Fire Technology

Through use of skip-fire technology, fine control of the effective engine displacement is possible. For example, firing every third cylinder in a 4-cylinder engine would provide an effective displacement of ⅓ of the full engine displacement, which is a fractional displacement that would not be obtainable by simply deactivating a set of cylinders.

U.S. Pat. No. 8,131,445 (which is incorporated herein by reference) teaches a skip-fire operational approach, which allows any fraction of the cylinders to be fired on average using individual cylinder deactivation. Performing cylinder deactivation requires the engine controller to control power driver outputs that actuate the cylinder deactivation elements. In other skip-fire approaches a particular firing sequence or firing density may be selected from a set of available firing sequences or fractions.

In a skip-fire operational mode the amount of torque delivered generally depends on the firing density, or fraction, of combustion events that are not skipped. Dynamic skip-fire (DSF) control refers to skip-fire operation in which the fire/skip decisions are made in a dynamic manner, for example, at every firing opportunity, every engine cycle, or at some other interval.

Further, in some applications referred to as multi-level skip-fire, individual working cycles that are fired may be purposely operated at different cylinder output levels, that is, using purposefully different air charge and corresponding fueling levels. By way of example, U.S. Pat. No. 9,399,964 (which is incorporated herein by reference) describes some such approaches.

The individual cylinder control concepts used in dynamic skip-fire can also be applied to dynamic multi-charge level engine operation in which all cylinders are fired, but individual working cycles are purposely operated at different cylinder output levels. Dynamic skip-fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis.

It should be appreciated that dynamic firing level engine operation is different than conventional variable displacement in which when the engine enters a reduced displacement operational state, a defined set of cylinders are operated in generally the same manner until the engine transitions to a different operational state. However, the techniques disclosed herein can be utilized in any variable displacement engine where a skipped cylinder can cause a torque disturbance affecting engine speed.

In a skip-fire engine, steady-state variations in RPM contain known frequency components, which can be reduced by using this knowledge to create a counter-torque provided by an electric motor. One way to do this is to produce a counter-torque signal including one or more harmonic frequencies of the length of the firing pattern. Alternatively, a predicted torque waveform can be constructed and a filtered version of this waveform can be used to reduce the engine speed variations.

These technologies have proven successful in some implementations of engines that use low pressure exhaust springs (LPES) for deactivated cylinders. However, in engines that use air springs (AS) or high pressure exhaust springs (HPES), the compression of the charge in the cylinder will require enough work, and its subsequent expansion produces enough work, that the effect can be sensed on the crankshaft because it will cause engine speed variation.

Additionally, cylinders that use air springs require them to be recharged (vent the current charge to the exhaust manifold, and intake a new charge from the intake manifold) periodically. These recharge events will also be a periodic source of engine speed variation.

Current techniques do not account for engine speed variation due to: compressing or expanding cylinders containing a charge (AS or HPES modes) or recharging a cylinder. Rather, current techniques only account for vibrations due to firing a cylinder and are only utilized for LPES.

One embodiment of the present disclosure involves using knowledge of the periodicity of the firing pattern and recharging pattern to produce a counter-torque signal to reduce engine speed variation. For example, a six-cylinder four-stroke engine that idles using a firing fraction of ⅓ at 600 RPM will fire a cylinder ten times per second (5 cycles per second, firing two cylinders per cycle). Regardless of the type of spring used (LPES, AS, HPES), this means the fundamental frequency is 10 Hz, and so a 10 Hz sinusoidal excitation by the supplemental power source can be used to reduce the engine speed variation. Higher harmonic frequencies can also be used. The effect of the spring type (LPES, AS, HPES) is that it changes the phase and/or magnitude of the sinusoid at each frequency can also be quantified, for example, through testing of the engine or sensor data during engine use and can be used in selecting the characteristics (e.g., phase, magnitude, frequency) of the one or more sinusoids selected.

Another sinusoid can then be added to reduce the vibration due to the recharging step. In the example above, the deactivated cylinders need to be recharged if an air spring (or HPES) is used. If the required recharge time is 20 cycles, and the recharges are distributed evenly over time, the recharge process will cause a ¼ Hz disturbance in the engine speed, since it will take 20 cycles to recharge the four deactivated cylinders.

It may be beneficial to cancel harmonics of the recharging rate, either additionally or instead of the fundamental depending on the NVH impact of the fundamental and/or the harmonics of the recharging rate. If the recharge events are approximately evenly spaced, for example one every 5 cycles, the 4th harmonic at 1 Hz for this example may be particularly strong and may be worth reducing or removing even without other harmonic considerations.

Some embodiments disclosed herein include constructing predicted torque profiles given the firing-skip pattern/history, spring type, and/or recharge pattern. For example, the torque output from a firing cylinder can be well modeled given the criteria of the amount of fuel burned and the engine speed. In some embodiments, the torque loss due to a recharging event can be similarly modeled based on engine speed, intake manifold pressure (IMP), and exhaust manifold pressure (EMP), as well as the spring-effect and spring mode used, including the decay of the spring after it is recharged. In some embodiments, the resulting torque waveform can be filtered to remove desirable components, like the average torque or DC term, and less important components, like high frequency terms that produce less NVH. The resulting filtered torque signal can then be inverted and the controller of the supplemental power source uses it as a command input to produce the smoothing counter-torque.

Such embodiments can, for example, reduce the amount of engine speed variation, which is perceived by an occupant of a vehicle as NVH. A discussion of the formation of canceling waveforms from multiple sinusoids is provided with respect to FIGS. 7A-7K below.

In the following detailed description, reference is made to the accompanying drawings that form a part hereof. The drawings show, by way of illustration, how one or more embodiments of the present disclosure may be practiced.

These embodiments are described in sufficient detail to enable those of ordinary skill in the art to practice one or more embodiments of the present disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, item "20" may be referenced as element "120" in FIG. 1, and a similar element may be referenced as "220" in FIG. 2.

As used herein, "a" or "a number of" something can refer to one or more such things. For example, "a number of valves" can refer to one or more valves. As used herein, "a plurality of" means two or more things.

FIG. 1 is a schematic diagram of a representative engine cylinder and valve system for an internal combustion engine for use with embodiments of the present disclosure. As shown in FIG. 1, an internal combustion engine has a number of cylinders 100 that mix fuel and air together and combust the mixture to provide power to a driveshaft (e.g., which turns the wheels that move the wheels of an automobile).

The mixing occurs within a cylinder chamber 114 of the cylinder 112. Air enters the cylinder chamber 114 through intake 102 that includes an intake valve 104 to open and close access between the intake and the cylinder chamber.

A piston 110 within the chamber compresses the fuel/air mixture (or just air in Diesel engines, as the fuel is added to the compressed air) and then the fuel/air mixture is ignited. This combustion event pushes the piston from its compression position 120 to its uncompressed position 122 and also pushes the arm 124 connecting to the crankshaft (which is not shown and is connected to the driveshaft, also not shown). The combusted air/fuel mixture (exhaust) is then pushed out of the cylinder chamber and into the exhaust system 106 as the piston 110 is moved back up to the compression position 120 with the exhaust valve 108.

Spring-Like Forces within the Cylinder

In a variable displacement engine system when a cylinder is skipped and there is air/gas in the cylinder, the remaining air/gas is trapped within the cylinder chamber and provides a spring-like force when compressed by the piston. For example, when the intake valves and the exhaust valves are not open, the compression by the piston creates a spring-like effect that acts to push the piston toward its uncompressed condition.

Using this mechanism, three kinds of spring-like effects can be created. A first is called a low pressure exhaust spring (LPES) force. In this type, after the firing of the cylinder (igniting of the fuel/air mixture in the cylinder chamber) is finished, the remaining gases are exhausted from the cylinder chamber so that the cylinder chamber is nearly completely empty. The exhaust valve is then closed, and the intake valve is not opened. This configuration provides little to no torque.

The second type is called an air spring (AS) force. In this type, the exhaust (after ignition of the fuel/air mixture in the cylinder chamber) is pushed out through the open exhaust valve by the piston. However, instead of closing all valves, the intake valve is opened and air is taken into the cylinder as the piston returns to its pre-compression position. Then, the intake valve is closed. The air is then compressed as the piston moves toward its compressed position, and the remaining air/gas counteracts the force of the piston increasingly the more that the air/gas is compressed.

The third type of spring effect is called a high pressure exhaust spring (HPES) force. This happens when the combustion of the fuel/air mixture occurs, but some or all of the combusted gas and fuel is kept in the cylinder during a subsequent compression by the piston. This can occur, for example, where cylinder deactivation occurs after a combustion event but prior to an exhaust event. In such an instance, all of the exhaust remains in the cylinder during the duration of deactivation of the cylinder.

All spring types are used in different applications, with diesel engines using air springs (typically) while gasoline engines may often use LPES or HPES. And, although the skip process can use any of the spring modes discussed herein, typically skip processes utilize an air spring mode that includes exhausting the cylinder, pulling air into the cylinder via the intake valve, and sealing the cylinder by closing all of the valves. This trapped air is then compressed and uncompressed as the engine cycles.

A couple of issues can arise, however, during such an air spring process. First, the air cools. This is due to several factors. For example, the air heats as it is compressed, but some of that heat is transferred to the cylinder wall. The subsequent expansion does not recover that heat.

Second, when compressed, some air will be pushed past the cylinder rings 118 (that form a seal between the ring surface and the cylinder chamber wall 116) that are supposed to trap the air in the cylinder. This may account for only a small loss during one cycle, but if it continues to occur for several cycles, it can result in the cylinder becoming emptied of air substantially or at least below a threshold level.

One benefit of maintaining air in the cylinder is that it keeps oil from migrating from the crankshaft and into the cylinder. This is particularly beneficial in Diesel engines, which typically have looser rings than gasoline engines do and are therefore more prone to oil leakage into the cylinders.

A recharge process can be implemented where the spring force has been utilized but has weakened (e.g., due to the above leakage) and needs a recharge. Further, a recharge process can also be implemented prior to switching a cylinder from skip mode to firing mode, for example, if it has not been recharged for a threshold number of cycles prior to a planned firing event. A recharge process can, for example, include: opening the exhaust valve, pushing out the exhaust gas, opening the intake valve, and pulling in air.

In one example, half of the cylinders of the engine are fired. For example, six cylinders with 1, 3, and 5 firing and 2, 4, and 6 skipped. The next cycle, again, cylinders 1, 3, and 5 are firing and 2, 4, and 6 are skipped. In this manner, cylinders 1, 3, and 5 are always firing and 2, 4, and 6 are always skipped. This can present problems, as discussed above.

Accordingly, in some implementations, the cylinders may need to be recharged. As illustrated in the graph 445 shown in FIG. 4 and discussed in more detail below, these recharge events (denoted by a −1) can be staggered to reduce the impact on NVH. However, even staggered over time, the individual recharge events do impact NVH as indicated in FIG. 2.

In another example, by running a firing fraction (FF) of ⅓ on a 6-cylinder engine (e.g., firing cylinders 1 and 6 and deactivating the other four cylinders), the four deactivated cylinders can be recharged (rebreathed) at a predictable interval. If the recharging interval is calibrated to a total of 20 cycles, the recharge events on the four deactivated cylinders can be equally spaced at 5 cycles apart (e.g., one cylinder can be recharged at each of cycles 5, 10, 15, and 20). FIG. 2, below, illustrates the RPM disruption that occurs when the cylinders are recharged.

Figure 2:
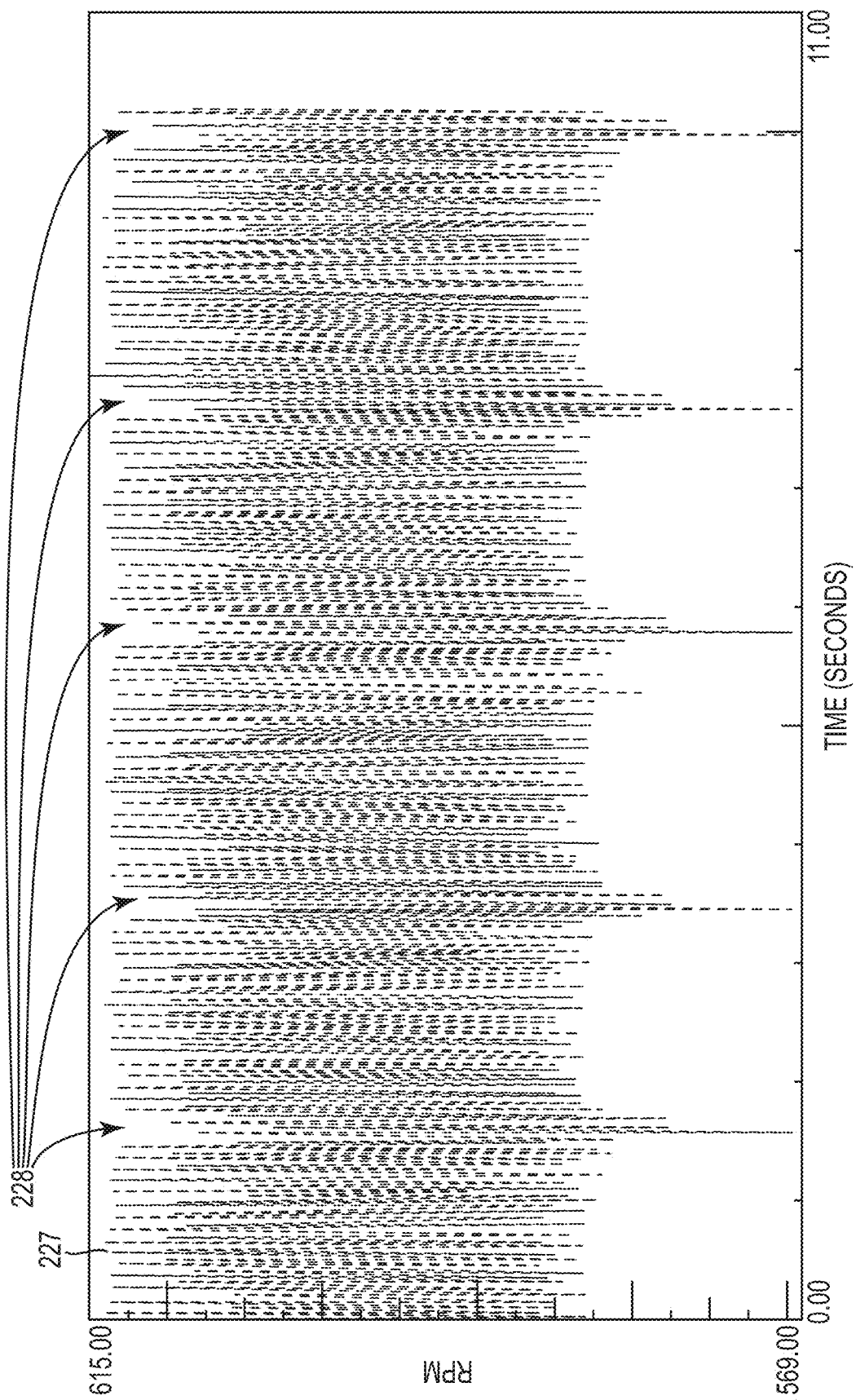
FIG. 2 is a graph showing RPM disruption due to recharging events in an internal combustion engine that may be used with embodiments of the present disclosure.

FIG. 2 is a graph showing RPM disruption due to recharging events in an internal combustion engine that may be used with embodiments of the present disclosure. FIG. 2 shows an example of RPM fluctuations caused by recharging events on deactivated cylinders while operating a firing fraction of ⅔ on an inline, 6 cylinder engine.

In this example, there is a fixed pattern where cylinder 1 and 6 are deactivated and the other four cylinders are active and firing in every cycle. Cylinders 1 and 6 are periodically recharged at a calibratable interval as shown. As can be seen in this illustration, the recharge events 228 have a noticeable effect on the overall RPM distribution 227 over time. This change in RPM distribution may be felt by the occupants of the vehicle.

These recharge events are identified as those in which a loss of torque is produced by the engine over a period of time (e.g., during and/or after the recharge event). In such embodiments, a counteracting torque can then be applied to the powertrain in a controlled manner by an energy source at a determined timeframe during and/or after the identified events such that the expected net powertrain torque is smoothed during the event.

In some skip-fire or other dynamic firing level modulation embodiments, the torque profile estimations are used in the selection of the (effective) operational firing fraction. In such embodiments, the fuel efficiency of various candidate firing fractions may be compared after considering the fuel efficiency implications of any smoothing torques that may be required to meet desired drivability criteria when operating at the respective firing fractions.

In some embodiments, the engine torque profile is filtered to identify selected harmonic components of the torque profile. A counteracting smoothing torque to apply to the powertrain may then be determined based on the filtered results.

In some such embodiments, the filtered results may be amplified based on one or more current engine parameters. When it is to be applied, the timing of the filtered signal may be delayed to align with the torque predicted to be produced by the engine. The amplified filtered signal may be inverted and used in the control of, for example, an electric motor/generator to source torque based on the inverted torque signal.

In some embodiments, the smoothing torque may be applied as one or more oscillating (e.g., sinusoidal) signals, whereas in others, the smoothing torque may be applied as impulses intended to offset portions of expected torque troughs.

In various embodiments, the torque applied by devices that add torque to the powertrain can be increased or decreased to effectively provide the desired smoothing torque. When devices that can both add and subtract torque are used, such as a motor/generator, either of these approaches may be used, or the devices may be varied between torque contributing and torque drawing states to provide the desired smoothing torque.

As discussed herein, the embodiments of the present disclosure describe various control methods in which an additional power source, in addition to the internal combustion engine, is operated in a manner that generates a smoothing torque, which is applied to a vehicle powertrain. The smoothing torque is any torque that is applied to help cancel out or reduce a variation in torque associated with skipping and/or recharging events in an internal combustion engine.

The smoothing torque can be generated by any suitable energy storage/capture/release device. One example would be an electric motor/generator with a battery and/or capacitor to store and release energy. Alternatively, any system or device that stores and captures/releases energy mechanically, pneumatically, or hydraulically may be used.

For example, a flywheel with a variable mechanical coupling, or a high-pressure fluid reservoir with valves controlling fluid flow to and from a turbine or similar device may be used to capture/release energy from a powertrain. The smoothing torque is applied in a manner which cancels out or at least partially reduces noise and vibration generated by the recharging process.

Figure 3:
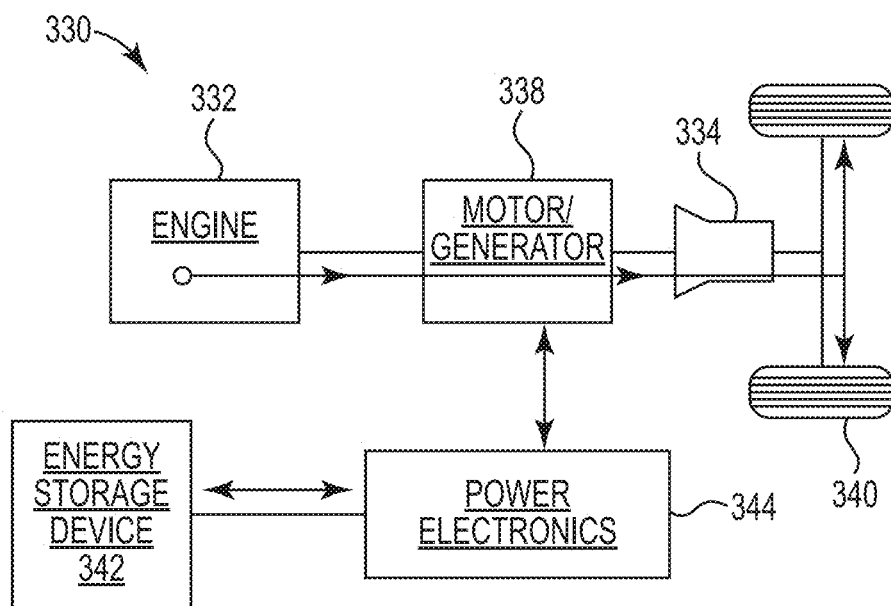
FIG. 3 is a schematic diagram of a representative vehicle's power components for an internal combustion engine for use with embodiments of the present disclosure.

FIG. 3 is a schematic diagram of a representative vehicle's power components for an internal combustion engine. More specifically, FIG. 3 illustrates an example parallel hybrid electric vehicle powertrain 330 and associated components that can be used in conjunction with the embodiments of the present disclosure. However, it should be appreciated that the same concepts can be applied to other hybrid powertrains, including but not limited to series hybrid electric configurations, power-split electric configurations, mild hybrid with a belt driven starter-generator (BSG), and hydraulic hybrid configurations.

FIG. 3 shows a skip-fire controlled internal combustion engine 332 applying torque to a powertrain drive shaft (not shown) which is connected to a transmission 334, which in turn drives selected wheels 340 of a vehicle. A motor/generator 338 is also coupled to the powertrain and is capable of either simultaneously generating electrical power (thereby effectively subtracting torque from the drive shaft) or supplementing the engine torque, depending on whether the engine is producing surplus torque or deficit torque relative to a desired powertrain torque output.

When the engine produces surplus torque, the surplus torque causes the motor/generator 338 to generate electricity which can be stored in the energy storage device 342 after conditioning by the power electronics 344. The energy storage device 342 may be, for example, a battery and/or a capacitor. The power electronics 344 may include circuitry to convert the output voltage on the energy storage device 342 to a voltage suitable for delivering/receiving power from the motor/generator 338.

When the engine produces deficit torque, the engine torque is supplemented with torque produced by the motor/generator 338 using energy previously stored in the energy storage device 342. Use of a capacitor as energy storage device 342 may lead to a larger improvement of the overall fuel economy of the vehicle by largely avoiding the energy losses associated with charging and discharging conventional batteries. This is particularly advantageous when relatively frequent storage and retrieval cycles are contemplated, as in the embodiments of the present disclosure.

FIG. 4 is a graph showing an example of skip, fire, and recharging event selections for an internal combustion engine that may be used with embodiments of the present disclosure. FIG. 4 illustrates a six cylinder engine with each column representing one cylinder (1-6) over a period of 60 cycles.

In the embodiment illustrated in FIG. 4, cylinders 1, 3, and 5 are always fired, with the firing illustrated by a "1". Cylinders 2, 4, and 6 are always skipped unless they are being recharged. Skip mode is illustrated with a "0" and a recharge event is illustrated by a "−1". As can be understood from this illustration, each of cylinders 2, 4, and 6 are recharged three times over the 60 cycles (every 20 cycles).

As illustrated in this graph, the recharge events can be staggered for each cylinder and with respect to the recharge events of the other cylinders. Such staggering reduces the impact on the vehicle occupant, as the events are not occurring multiple times over a short period.

Figure 5A:
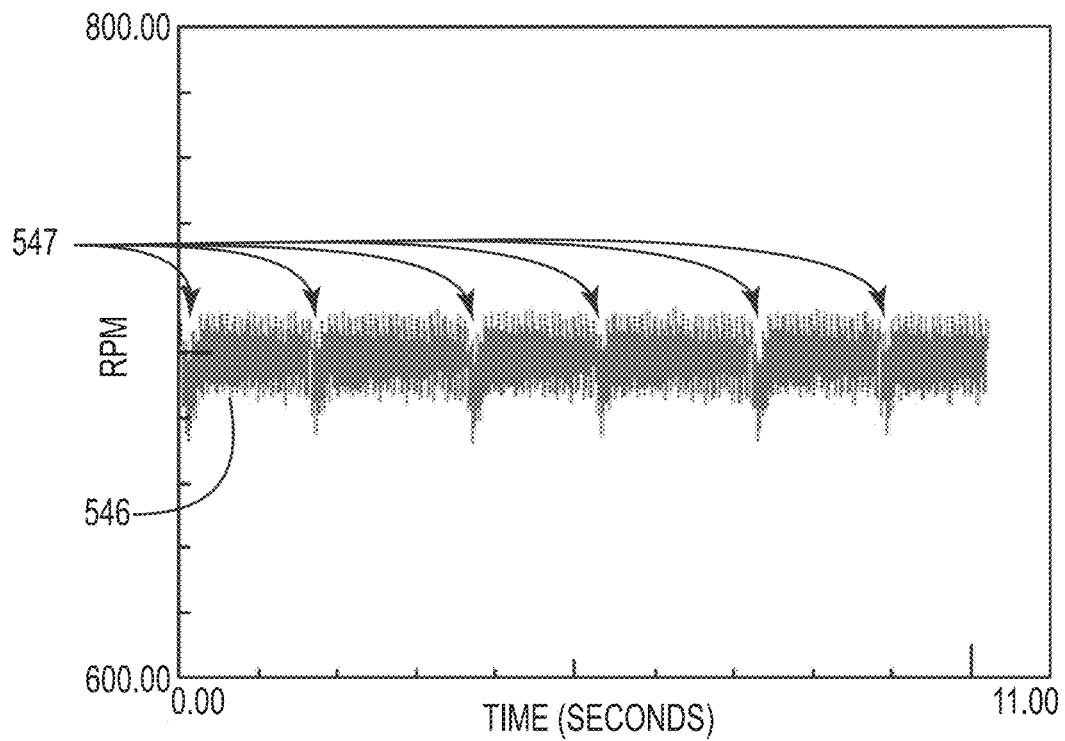
FIG. 5A is another graph showing RPM disruption due to recharging events in an internal combustion engine that may be used with embodiments of the present disclosure.

FIG. 5A is another graph showing RPM disruption due to recharging events in an internal combustion engine that may be used with embodiments of the present disclosure. In a system that uses an air spring for deactivation, a recharging event typically starts by opening the exhaust valve first to exhaust any trapped air and then opens the intake to take in a fresh charge of air (rebreathing). The following compression stroke will have a higher negative torque due to a higher quantity of air trapped in the cylinder compared to during the leaked-down state just prior to the rebreathing event.

With respect to recharging events, the proposed system uses feedforward information from the firing fraction and recharging controller and schedules a cancelling torque generated by an additional power source in order to cancel the torque fluctuation. Among other benefits, this improves smoothness of torque delivery, idle control (in idle conditions), and NVH and reduces signal fluctuations going into DSF and other closed loop control systems. In some embodiments, appropriate time delays can be put into the additional power source control system to align with the timing of the torque bump/torque sag to be cancelled by the power provided by the additional power source. This time delay could be crank-angle-based or time-based and could also be a function of engine speed.

It should be noted that the embodiments of the present disclosure can also be utilized during a re-exhausting event before a fire event after a long period of skip events (this is distinct from periodically recharging a deactivated cylinder with no immediate intent to refire it). In such implementations, the exhaust and intake strokes just before a refire also have a negative pumping torque signature that can be cancelled in a feedforward manner. Further, in an alternative embodiment, the cancellation signature can be described in terms of harmonics in the frequency domain instead of individual time-domain pulses (time domain is shown in FIG. 5A).

To provide a cancellation instruction to the additional power source, given a firing fraction and a given number of skip cycles on a cylinder before recharge, the frequency of occurrence of a recharging event can be predicted. For example, when using a FF of ⅓ on a 6-cylinder engine (e.g., firing cylinders 1 and 6 and deactivating the other four cylinders), the four deactivated cylinders will rebreathe at a predictable interval. If, for instance, the recharging interval is calibrated to 20 cycles, the recharge events on the four deactivated cylinders can be equally spaced at 5 cycles apart. At an engine speed of 600 RPM, this translates to a recharging frequency of 1 Hz. As such, the additional power source torque smoothing controller can then be set to cancel this 1 Hz fluctuation using, for example, least mean squares (LMS) or recursive least squares (RLS) minimization of RPM fluctuation feedback, among other cancellation techniques.

Transitions between FFs or between variants of the same FF can also have predictable recharging events/frequencies. For example, toggling back and forth between ½A and ½B (½A=cylinders 1, 3, and 5 and ½B=2, 4, and 6) requires three cylinders to recharge quickly one after the other in the same cycle. Depending on the frequency of toggling, the recharge frequency can be calculated and fed forward to the additional power source controller (e.g., engine controller) to generate the cancellation torque at the time of these recharge events.

In the illustration of FIG. 5A, the firing fraction is ⅔ and the engine speed is 700 RPM. The skipped cylinders are being recharged every 20 cycles but are staggered from each other. In this example, too, a dip 547 in RPM 546 is visible in the data at times associated with the recharge events. Such disruptions to RPM create undesirable NVH.

To reduce or eliminate this undesirable condition, a waveform of this torque disturbance for each recharge event can be determined if several criteria are known. For example, criteria that can be useful include: what the cylinders are doing during the recharge (this is dependent on the type of spring-effect used: LPES, AS, HPES) and the torque effect of a recharge event. Such information can be estimated or established based upon operational data of this engine or a similar engine.

Figure 5B:
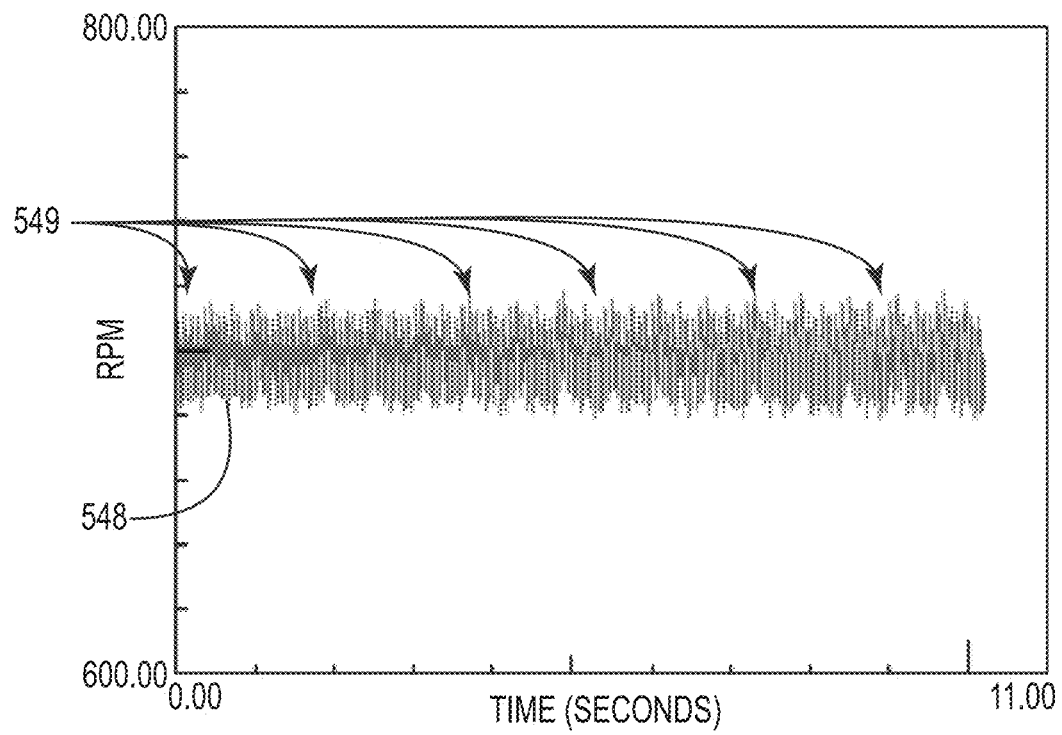
FIG. 5B is a graph showing a corrected RPM achieved through use of an embodiment of the present disclosure.

FIG. 5B is a graph showing a corrected RPM achieved through use of an embodiment of the present disclosure. In FIG. 5B, the data used to determine the torque disturbance has been used to determine a response from a secondary power source that supplements the torque provided by the primary power source to reduce or eliminate the RPM disruptions during periods associated with the recharge events 549 in the RPM 548 of the engine. In this manner, through use of the embodiments of the present disclosure, the NVH impacts of the recharging events can be reduced or eliminated.

Figure 6A:
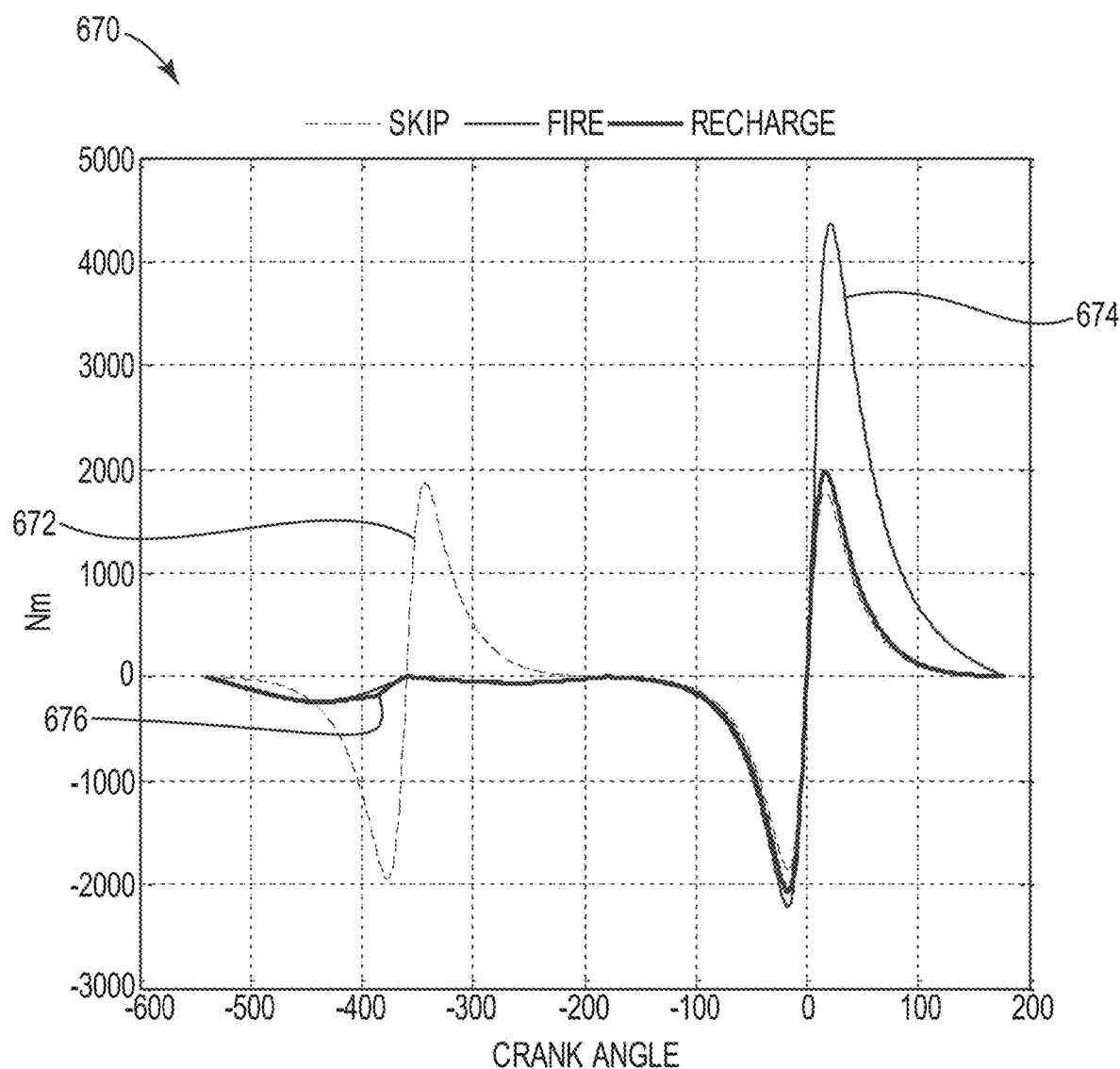
FIG. 6A is a graph showing torque disruption timing and magnitude due to skip, fire, and recharging events in an internal combustion engine that may be used with embodiments of the present disclosure.

FIG. 6A is a graph showing torque disruption timing and magnitude due to skip, fire, and recharging events in an internal combustion engine that may be used with embodiments of the present disclosure. This graph 670 illustrates types of wave disruptions each mode of operation creates and crank angles (i.e., crankshaft angle with respect to top dead center (TDC)) (e.g., shown at 126 of FIG. 1) at which each type of disruption occurs.

For example, a disturbance related to a combustion event (fire) 674 occurs as the cylinder approaches TDC (0 degrees) as do smaller disturbances associated with skip 672 and recharge 676 events. A smaller disturbance also occurs with skip events as the crankshaft angle approaches −360. The identification of the crank angle and magnitude can be used to determine the magnitude and timing of the actuation of the secondary power source.

Figure 6B:
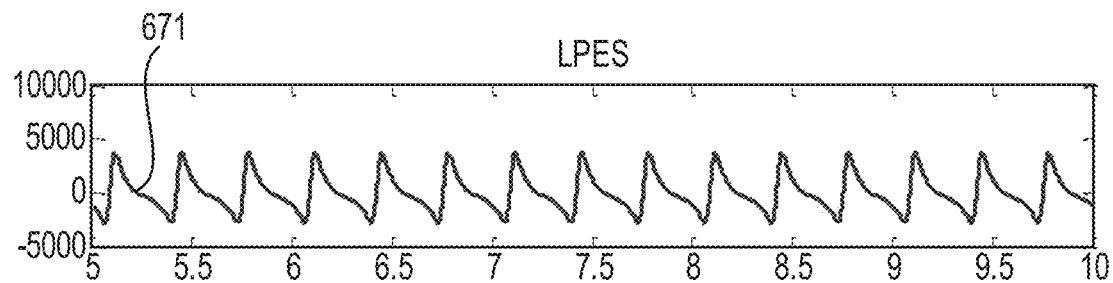
FIGS. 6B-6D are graphs showing torque disruption timing and magnitude due to skip and recharging events in an internal combustion engine that may be used with embodiments of the present disclosure.
Figure 6C:
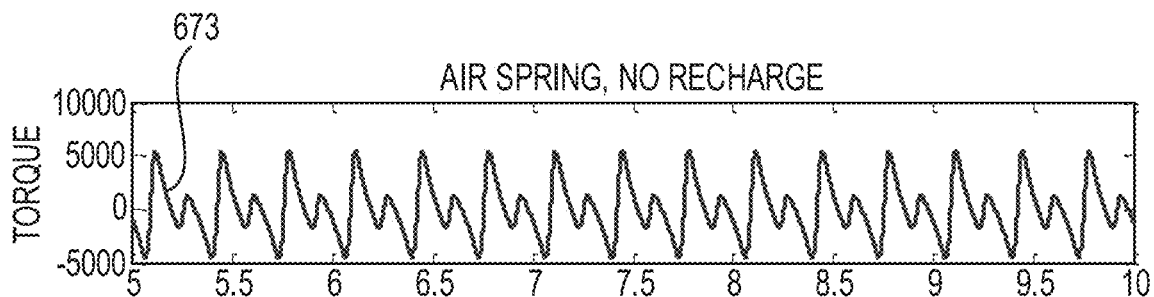
Figure 6D:
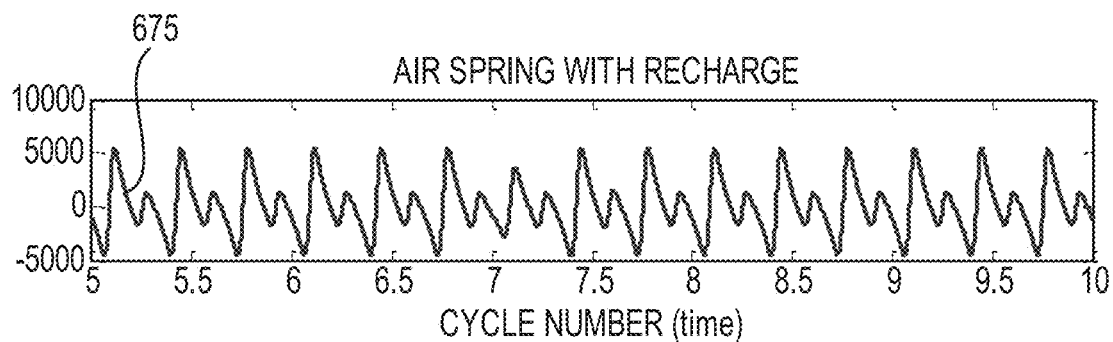

FIGS. 6B-6D are graphs showing torque disruption timing and magnitude due to skip and recharging events in an internal combustion engine that may be used with embodiments of the present disclosure. FIG. 6B illustrates a graph showing the torque disruption 671 of a low pressure exhaust spring (LPES). In this implementation, the cylinder has little to no air/gas in the cylinder chamber. In this graph, the torque output is a uniform, repeating pattern for each cycle.

FIG. 6C illustrates a graph showing the torque disruption 673 of an air spring (AS), as discussed above. In this implementation, the cylinder has gas in the cylinder chamber which has replaced most or all of the exhaust gas that has been pushed out of the cylinder chamber, and no recharge event is done. In this graph, the torque output is more complex, but is also a uniform, repeating pattern for each cycle.

FIG. 6D also illustrates a graph showing the torque disruption 675 of an air spring (AS), but in this graph, a recharge event is illustrated during cycle 7 between 7 and 7.5. As illustrated, in this graph, the torque output is not a uniform, repeating pattern for each cycle and the difference shown, although subtle, may be perceptible to an occupant of a vehicle. This is particularly the case if the disruption is a low frequency (e.g., below 10 Hz), which recharge events may create depending on other engine criteria discussed below.

Figure 6E:
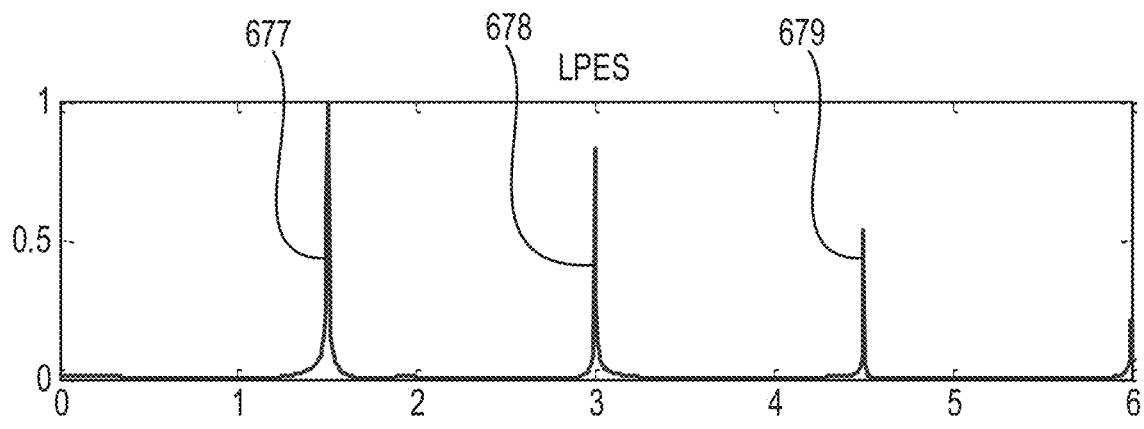
FIGS. 6E-6G are graphs showing torque disruption frequency and magnitude due to skip and recharging events in an internal combustion engine that may be used with embodiments of the present disclosure.
Figure 6F:
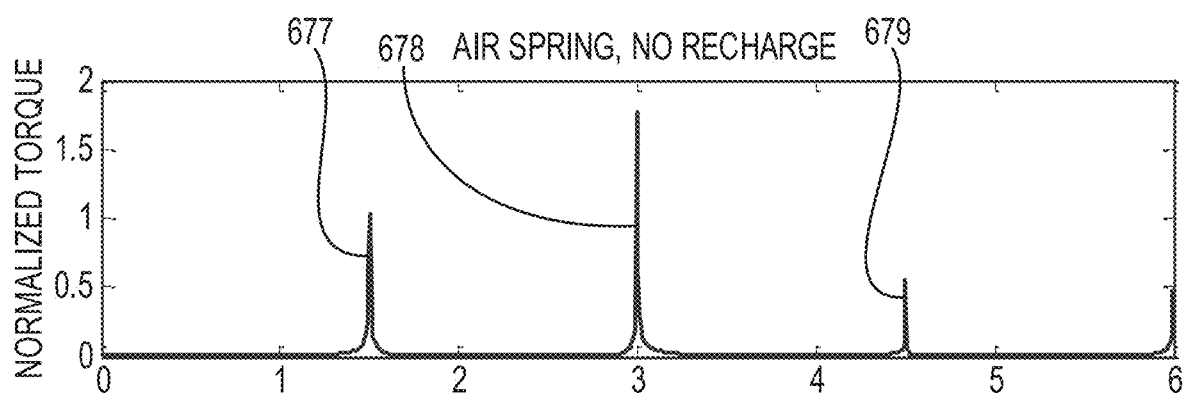
Figure 6G:
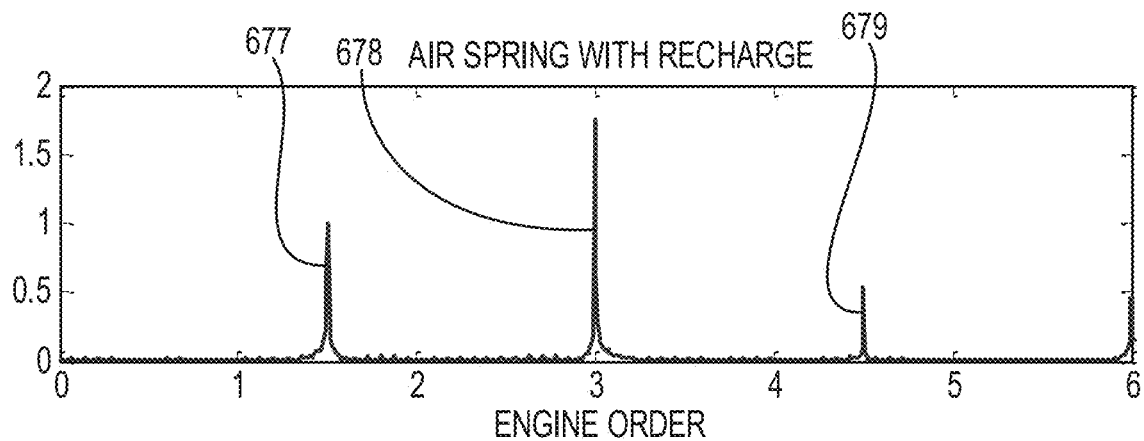

FIGS. 6E-6G are graphs showing torque disruption plotted showing frequency and magnitude due to skip and recharging events in an internal combustion engine that may be used with embodiments of the present disclosure. In these figures, the frequency axis is the engine order (0-6) with spikes at approximately 1.5, 3.0, and 4.5 (illustrated by elements 677, 678, and 679, respectively). Because this is a six-cylinder engine, the 3rd order 678 is present. The y-axis is normalized to show the 1.5 order (due to the skip-fire pattern) 677 with a size of 1 in FIG. 6E. However, when an air-spring is used (in FIGS. 6F ang 6G, the relative size of the 3rd order 678 approximately doubles (to near 2.0), creating more vibration than with the LPES and motivating cancellation using a secondary power source. It is difficult to see the frequency effect of recharging at this scale, because it is an infrequent, relatively low-energy event. But, because it is low frequency, it is felt more easily (and is more annoying to occupants) than the higher frequency excitations from combustion and air springs. As such, it should be reduced or eliminated using this data.

Figure 6H:
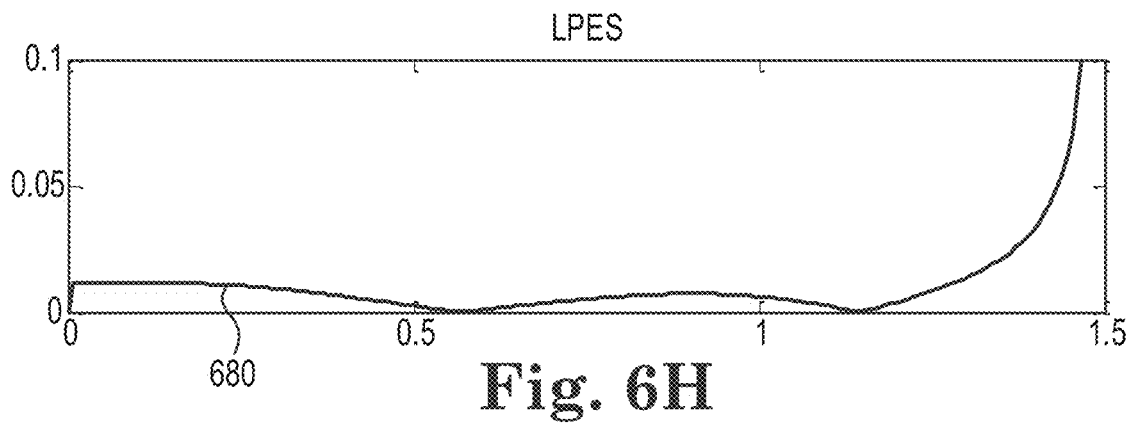
FIGS. 6H-6J are graphs showing torque disruption timing and magnitude with an emphasis on low frequencies due to skip and recharging events in an internal combustion engine that may be used with embodiments of the present disclosure.
Figure 6I:
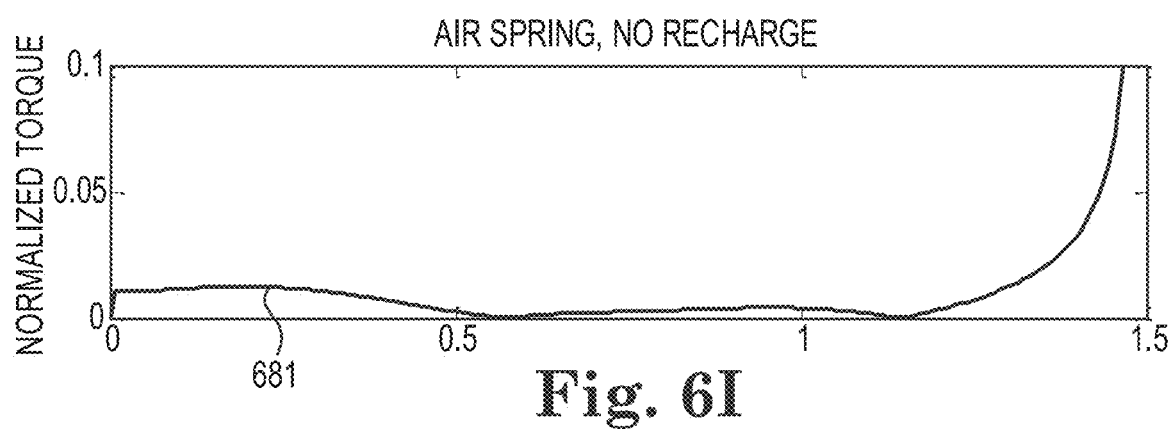
Figure 6J:
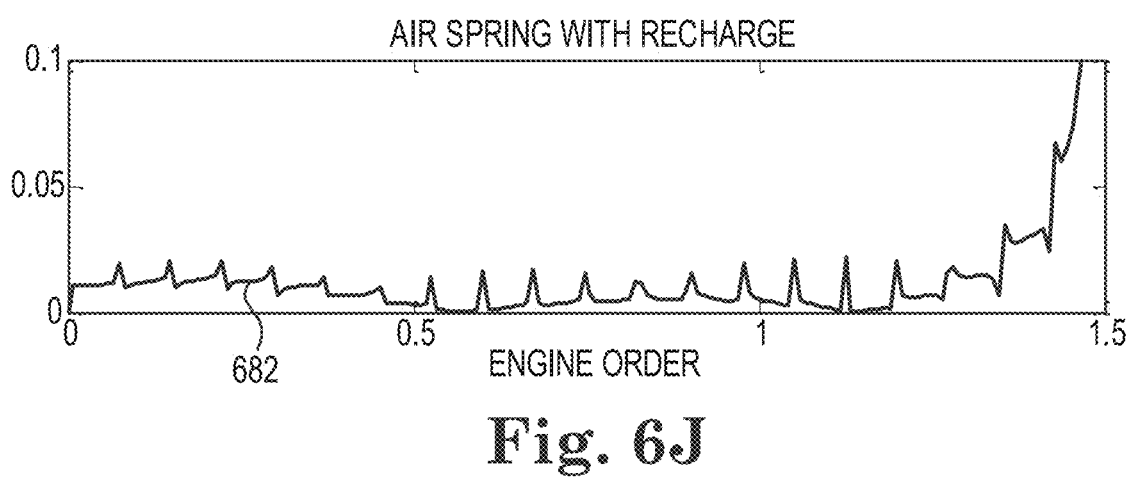

FIGS. 6H-6J are graphs showing torque disruption timing and magnitude with an emphasis on low frequencies due to recharging events in an internal combustion engine that may be used with embodiments of the present disclosure.

In some implementations, the recharging event happens about once every seven engine cycles, which is low frequency. However, as shown at 682 in FIG. 6J, as compared to lines 680 and 681 of FIGS. 6H and 6I, it also has many higher harmonics due to the limited duration of its effect. These harmonics can also be potentially problematic from an NVH perspective. Therefore, removing disruptions from recharging may also be beneficial for this reason.

Figure 6K:
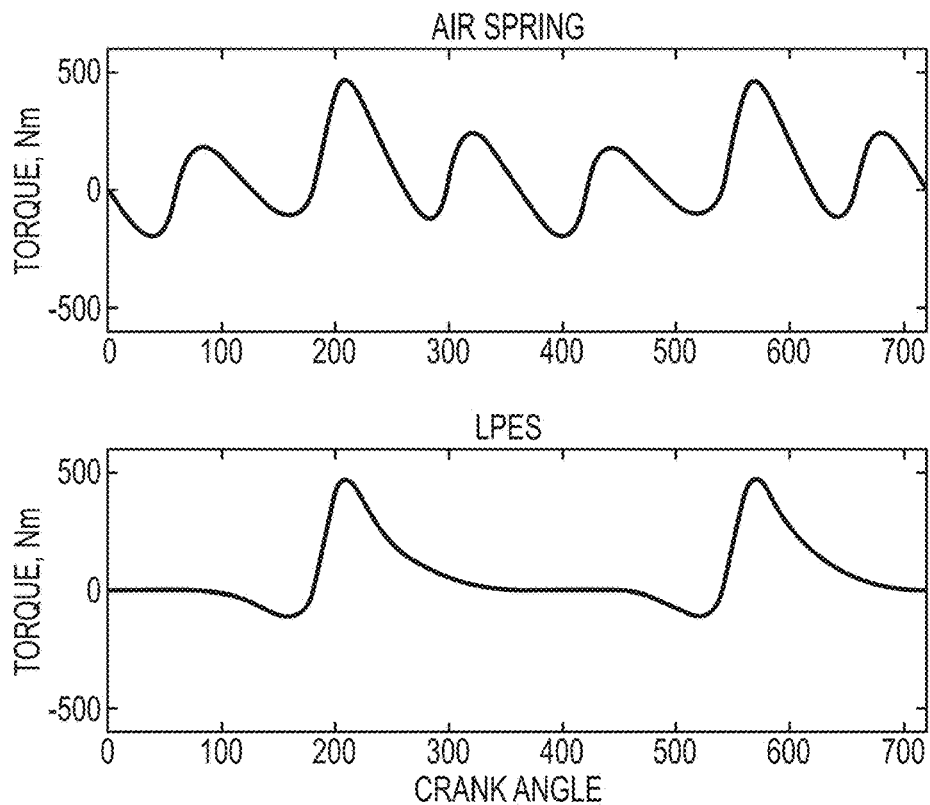
FIGS. 6K-6L are graphs showing the differences between AS disruptions and LPES disruptions and the relative size of their frequency components in an internal combustion engine that may be used with embodiments of the present disclosure.
Figure 6L:
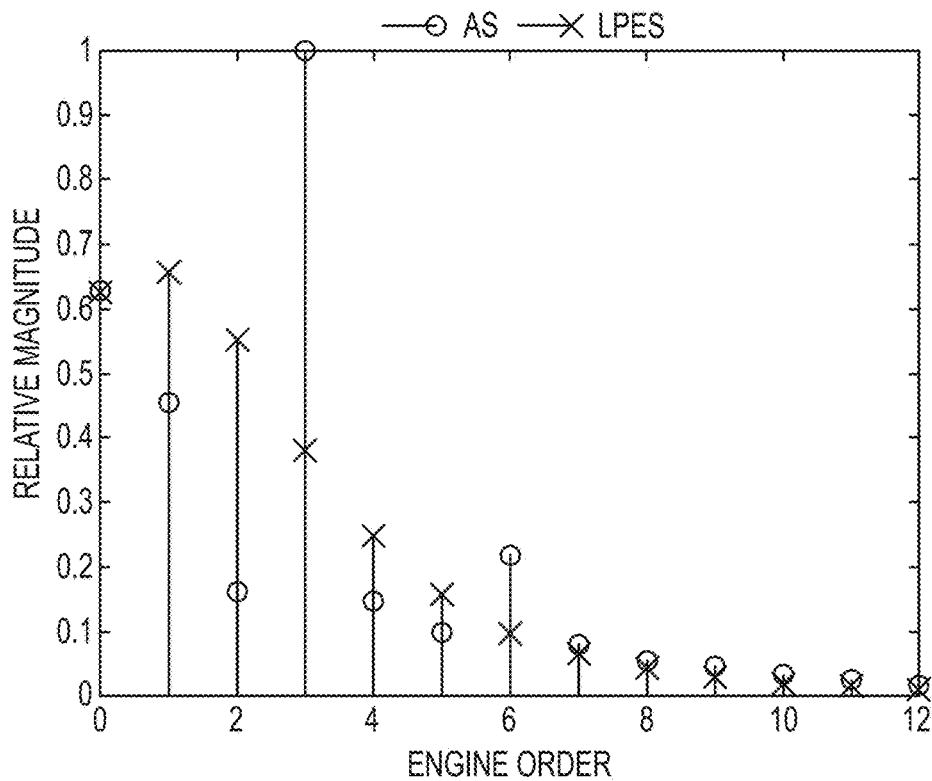

FIGS. 6K-6L are graphs showing the differences between AS disruptions and LPES disruptions and the relative size of their frequency components in an internal combustion engine that may be used with embodiments of the present disclosure. FIG. 6K illustrates the difference between engine disruptions of an engine using an air spring (top graph) and one that does not (LPES in bottom graph).

As can be seen from these graphs, the AS disruption is a much more complex waveform and as such, modeling using a single sinusoidal wave will not result in an effective reduction of the waveform, as it might have for the LPES waveform shown. It is in such situations where the reduction processes described herein may be most beneficial.

The graph in FIG. 6L illustrates the relative size of the frequency components. This demonstrates that accounting for an AS, through use of multiple harmonic sinusoids as is done in the embodiments of the present disclosure, will increase the accuracy in cancelling the torque disruptions of AS spring related disruptions as shown in FIG. 6K.

FIGS. 7A-7K illustrate an example of an approximation technique for motor torque smoothing by building a periodic waveform using sinusoids that may be used with embodiments of the present disclosure. As illustrated, multiple harmonic sinusoids based on harmonics of the supplemental power source can be combined to form a waveform to reduce or remove the disruptive waveform. As the number of harmonics included in the approximation of the disruptive waveform increases, the error between the disruptive waveform and the approximated waveform goes to zero.

Figure 7A:
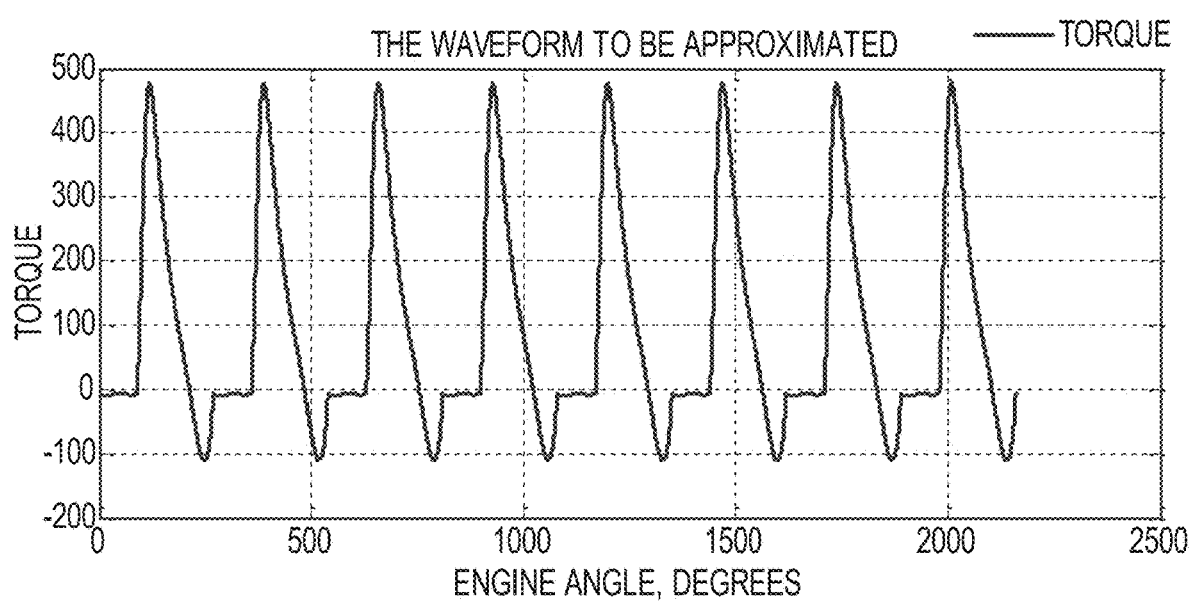
FIGS. 7A-7K illustrate an example of an approximation technique for motor torque smoothing by building a periodic waveform using sinusoids that may be used with embodiments of the present disclosure.
Figure 7B:
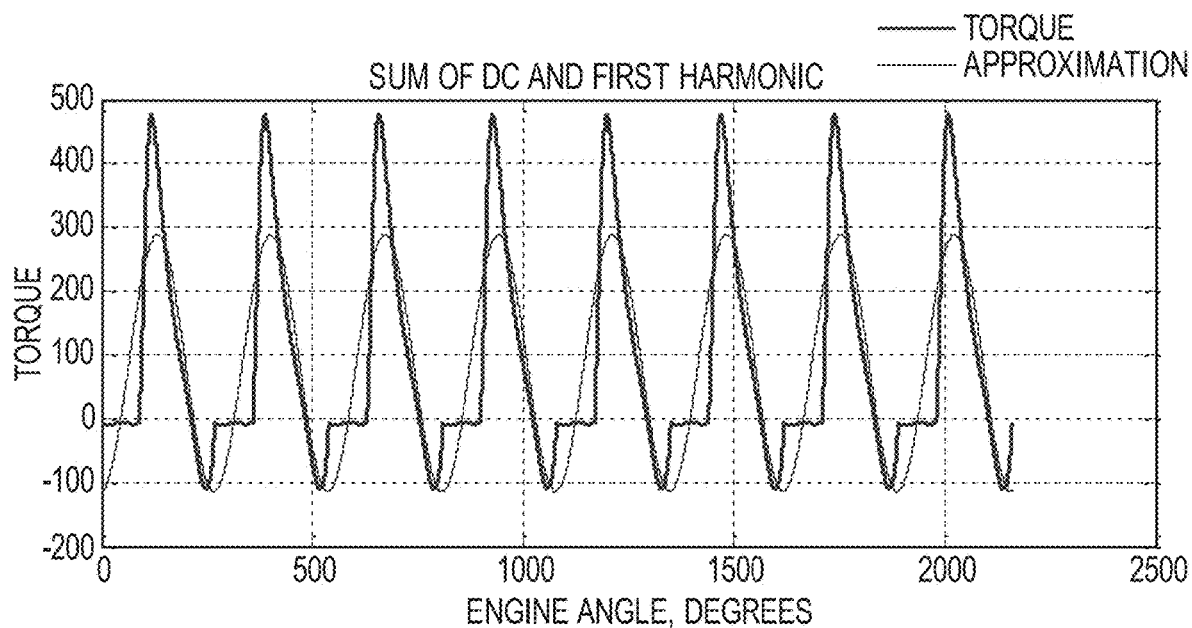

FIG. 7A illustrates the disruptive waveform to be approximated. It was created as a torque waveform generated using a fire-skip-skip pattern. This example waveform has a fundamental period of 270 crank angle degrees.

In some implementations, this engine torque is understood to include a fixed component (i.e., a DC term) and a variable component that can be represented by multiple harmonic sinusoids, including a first harmonic (i.e., fundamental frequency) and other harmonics. The fixed DC term typically represents the force that propels the vehicle and the harmonics are the unavoidable result of the variation in torque generated by an internal combustion engine as its cylinders move through the various strokes of a combustion cycle.

Figure 7C:
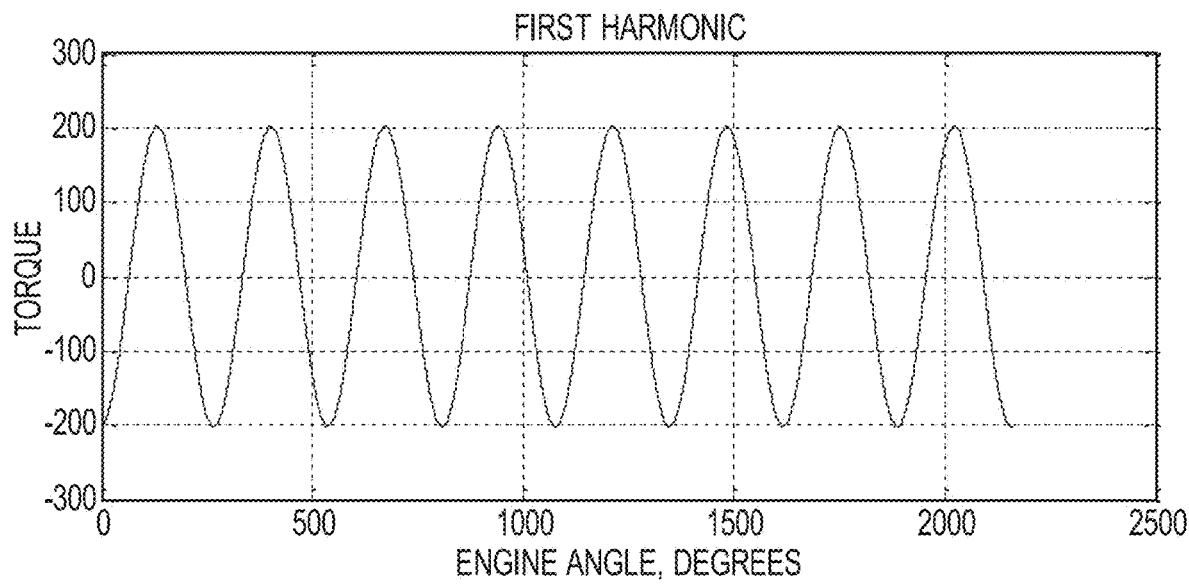
Figure 7D:
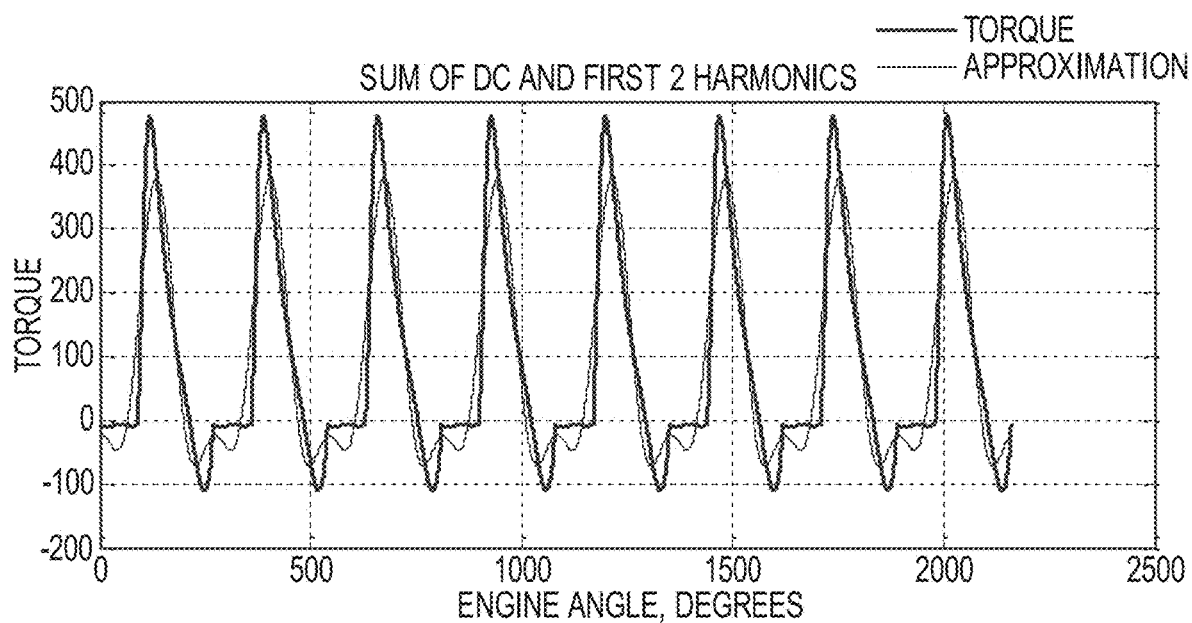

In this example, the DC term is the average harmonic contributing torque (about 87 Nm) and the first harmonic, illustrated in FIG. 7C, has the same fundamental period as the pattern of the disruptive waveform. The DC term (e.g., 87 Nm) can be added to the first harmonic to create the approximation shown in FIG. 7B.

Figure 7E:
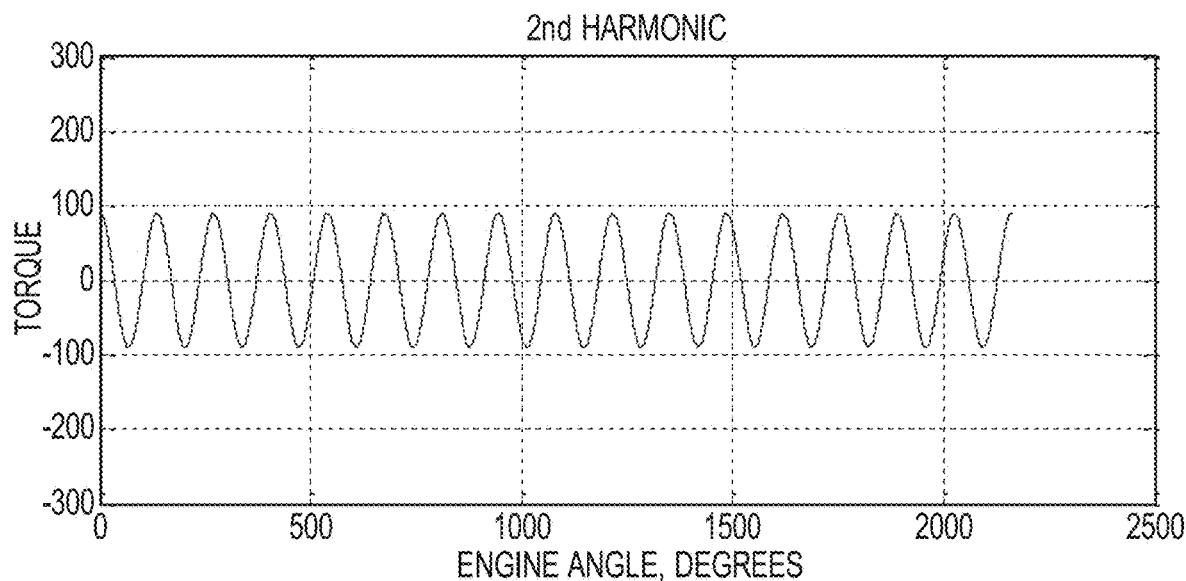
Figure 7F:
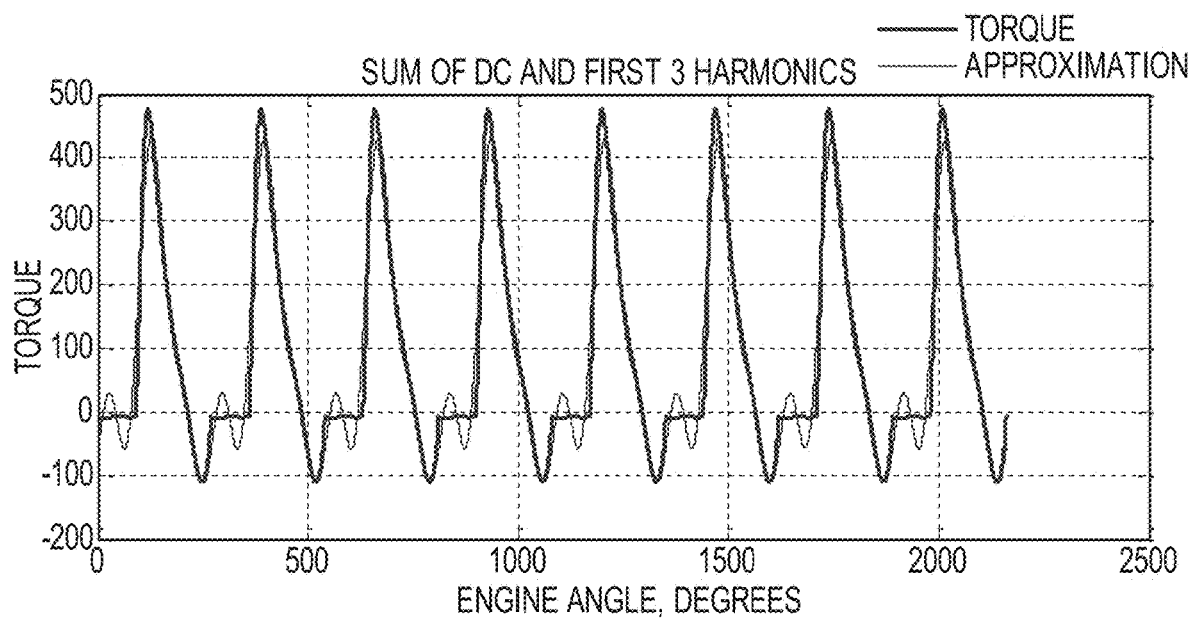

The second harmonic, shown in FIG. 7E, oscillates twice in the fundamental period. The second harmonic can be added to the DC term and the first harmonic to create the approximation shown in FIG. 7D. In this manner, the approximated waveform can become more similar to the disruptive waveform as the smaller sinusoids define some of the finer details of the disruptive waveform.

As can be seen from these illustrations, the phase or timing of the use of these harmonics is important in building the waveform to reduce or eliminate the disruptive waveform. Accordingly, the phase or timing can be determined through engine testing and/or sensor data taken from engine sensors during engine operation.

Figure 7G:
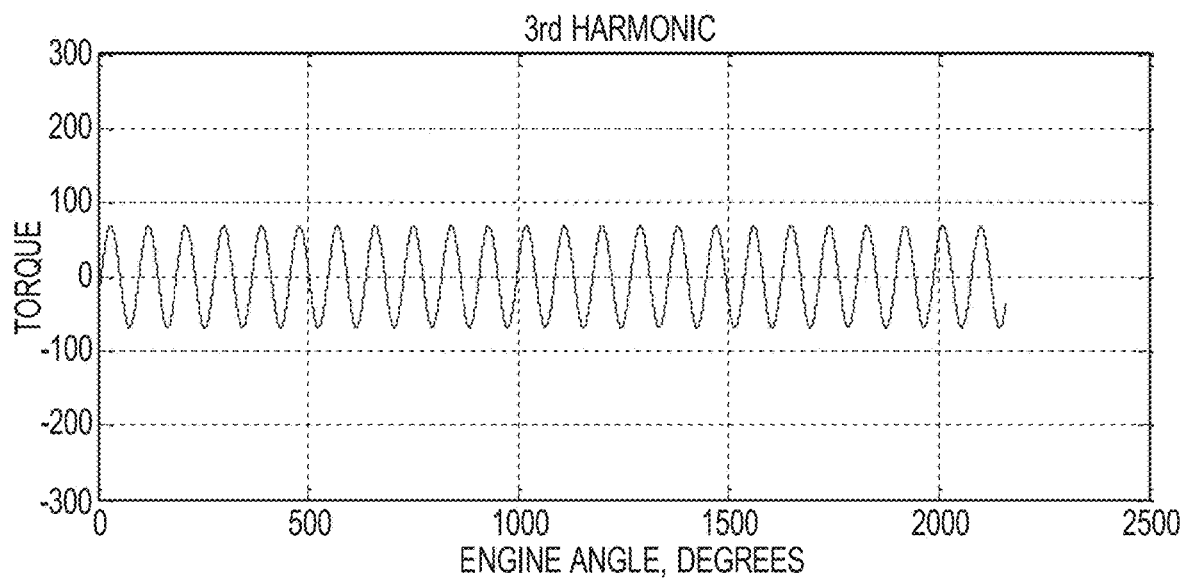
Figure 7H:
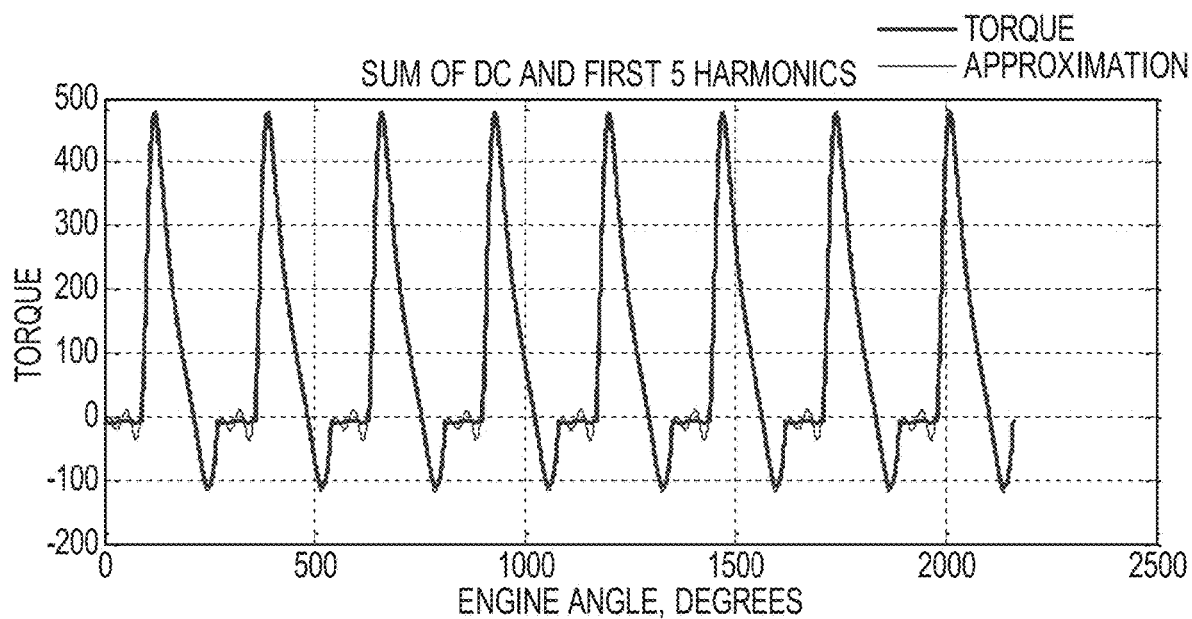

The third harmonic, shown in FIG. 7G, oscillates three times in the fundamental period. The third harmonic can be added to the DC term and the first and second harmonics to create the approximation shown in FIG. 7F. As can be seen with this and the following smaller waveforms, the use of these smaller sinusoids moves the error between the approximated waveform and the disruptive waveform closer to zero each time a harmonic sinusoid is added to the approximation.

Figure 7I:
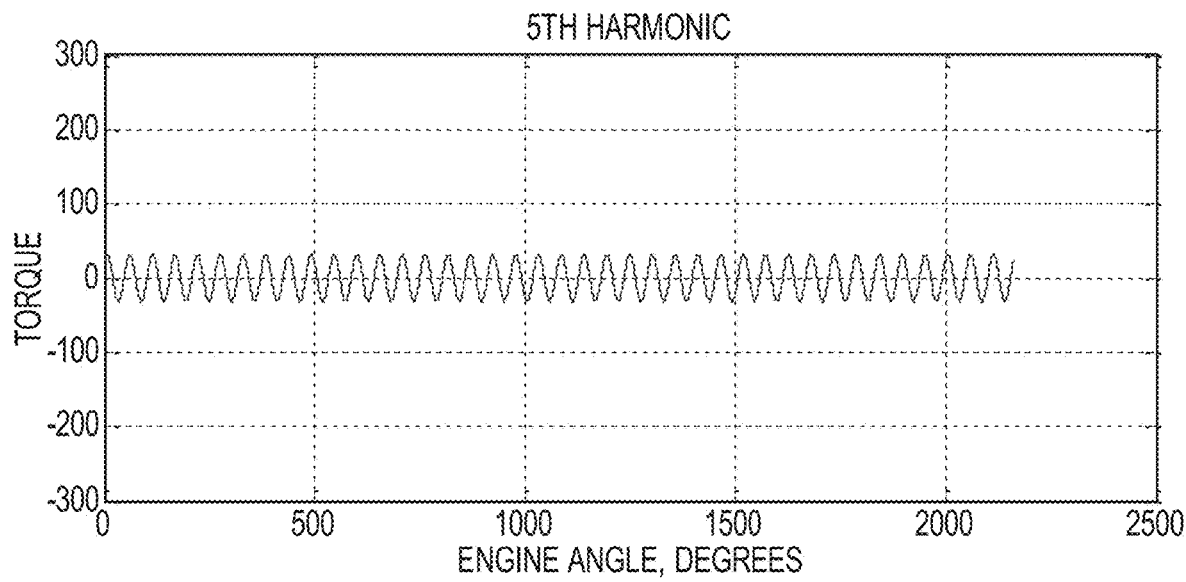
Figure 7J:
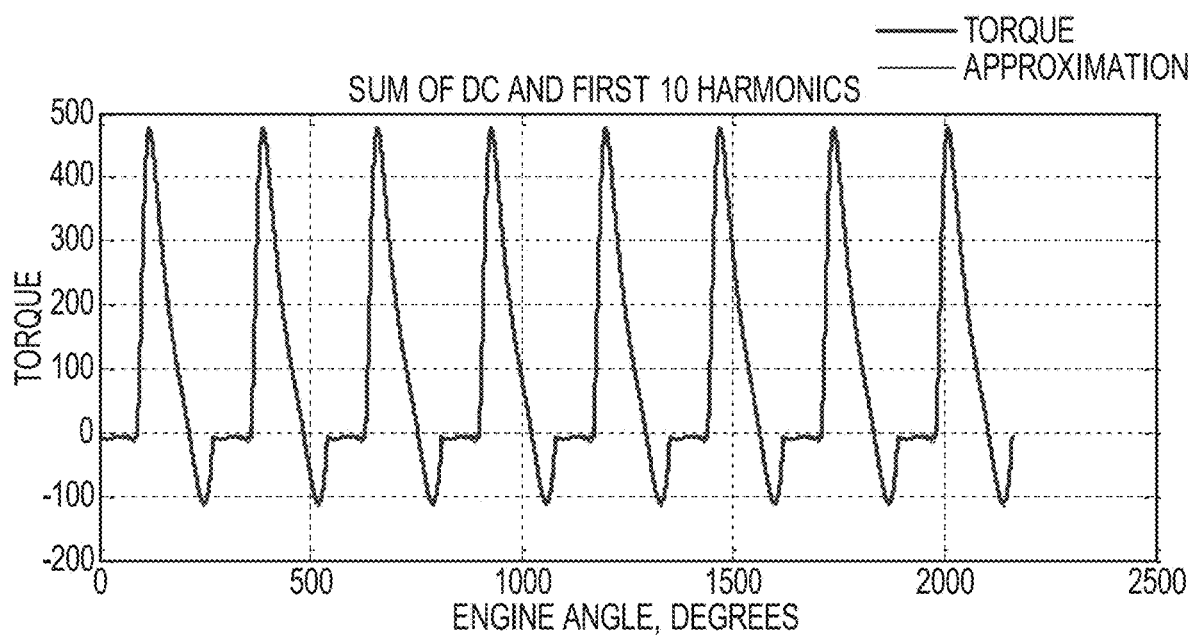

The fifth harmonic, shown in FIG. 7I, oscillates five times in the fundamental period. The fifth harmonic can be added to the DC term and the first, second, and third harmonics to create the approximation shown in FIG. 7H. Through this addition, there is very little difference in torque between the approximated and disruptive waveforms.

Figure 7K:
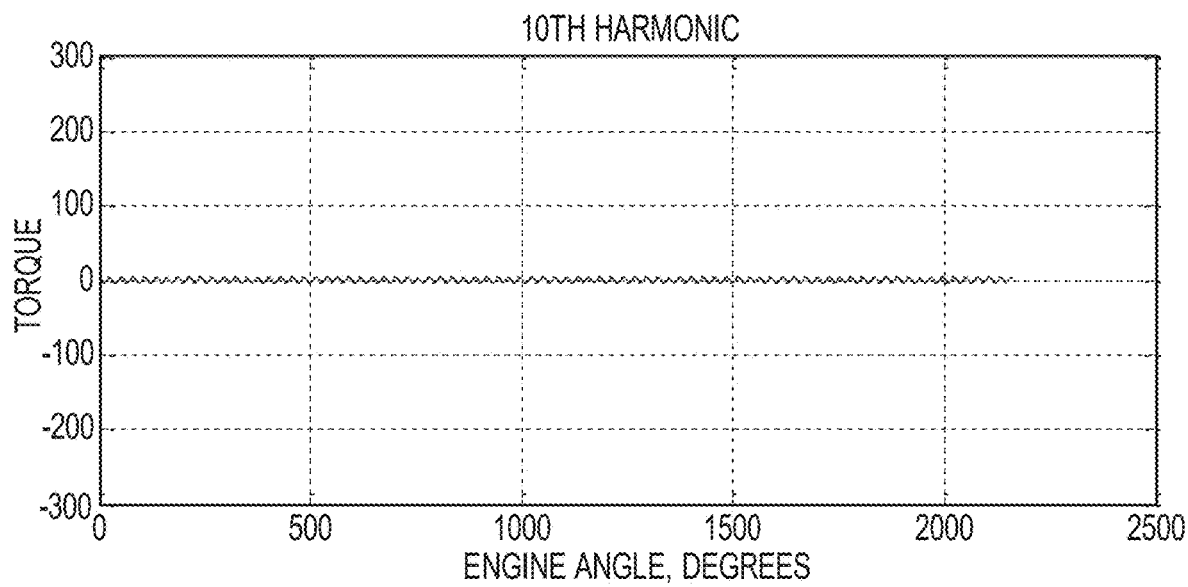

The tenth harmonic, shown in FIG. 7K, oscillates ten times in the fundamental period. The tenth harmonic can be added to the DC term and the first, second, third, and fifth harmonics to create the approximation shown in FIG. 7J. Through use of this sinusoid, the approximation and the disruptive waveforms are very similar and NVH impact is nearly completely removed and the remaining impact is imperceptible to a vehicle occupant.

Although five harmonics are shown in this example, it may be that less or more harmonics may be utilized and that different numbers of harmonics may be used during different engine cycles. Further, the selection of the harmonics used (e.g., 1st, 5th, 10th) is based on a best fit calculation that can be performed by software of the engine controller discussed herein, and the best fit calculation can determine, for example, the number of harmonics to be used, the types of harmonics to be used, and the timing of use of each harmonic.

Such a process can, for example, include selecting a periodic disruptive waveform to approximate, determine a first harmonic sinusoid from a group of harmonic sinusoids that reduces the error between an approximated waveform and the disruptive waveform, and determine a timeframe for utilizing the first harmonic to form a first version of an approximated waveform. This process can then be repeated to prepare the subsequent one or more sinusoids to be added to the approximated waveform to form subsequent versions of the approximated waveform.

It should be noted that in some embodiments, if the exhaust gas recirculation (EGR) fraction can be controlled for an individual cylinder, the firing history of that cylinder can be used to set the EGR fraction. For example, if the cylinder was fired the cycle before the current cycle, the EGR fraction can be set to nominal (e.g., a predetermined fraction). If the cylinder was skipped once before the current cycle, the EGR fraction can be set to ½ nominal, and for two or more skips it can be set to zero. In this manner, the exhaust gas rather than air from outside the engine can be provided through the intake.

Figure 8:
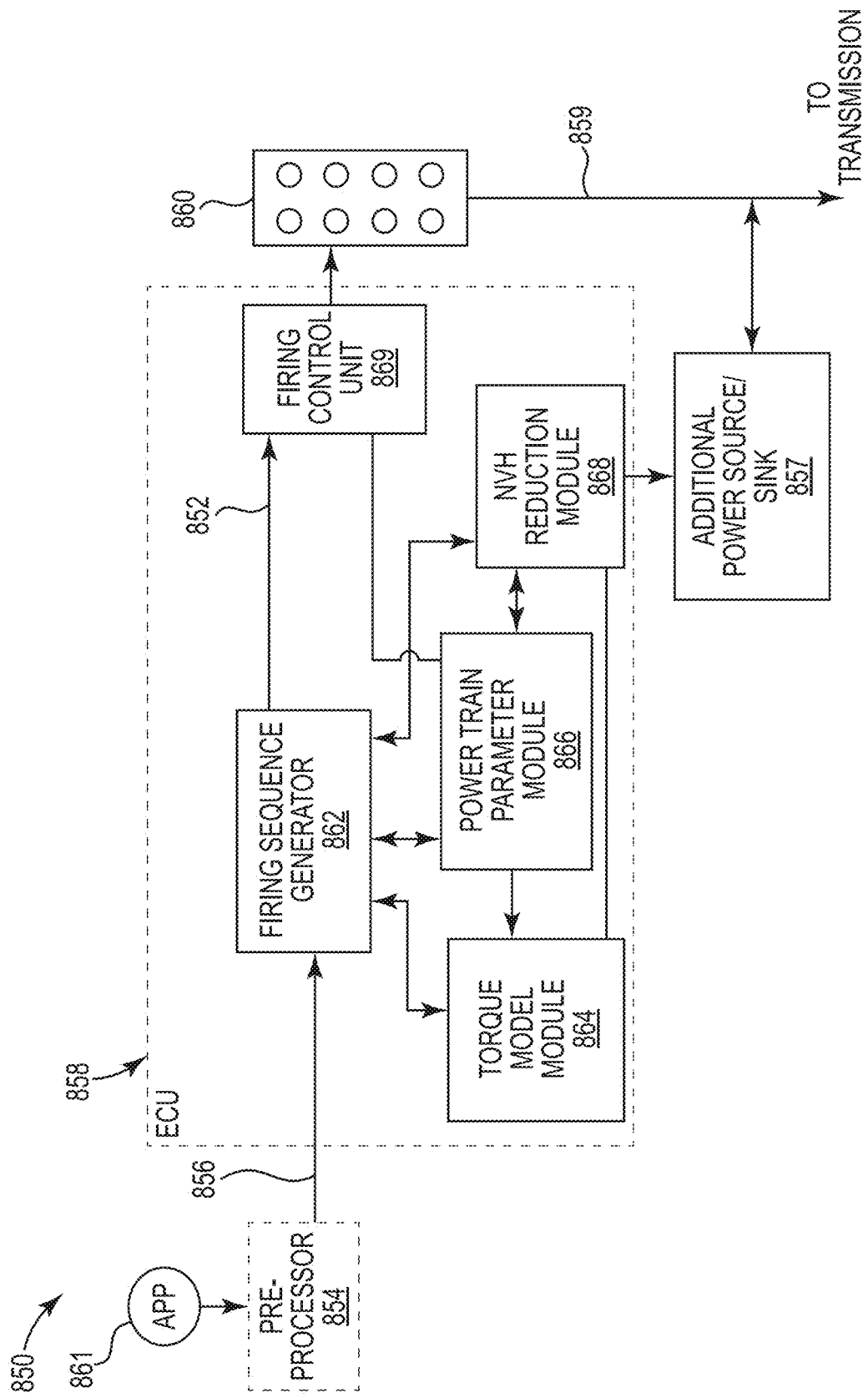
FIG. 8 is a schematic diagram of an engine controller for an internal combustion engine for use with embodiments of the present disclosure.

FIG. 8 is a schematic diagram of an engine controller for an internal combustion engine for use with embodiments of the present disclosure. FIG. 8 shows a hybrid vehicle control system suitable for controlling the hybrid vehicle powertrain shown in FIG. 3 according to a particular embodiment. The vehicle control system 850 includes an engine control unit (ECU) 858, an internal combustion engine 860, a powertrain 859, and an additional power source 857.

The additional power source may include one or more power sources, such as power electronics, a motor/generator, and/or an energy storage device. The ECU 858 can receive input signals 856 representative of the desired engine output associated with a skipping or recharging event (i.e., during or after the skipping or recharging event as the torque from the primary power source recovers).

The input signal 856 may be treated as a request for a desired engine output or torque. The signal 856 may be received or derived from an accelerator pedal position sensor (APP) 861 or other suitable sources, such as a cruise controller, a torque calculator, etc.

An optional preprocessor 854 may modify the accelerator pedal signal prior to delivery to the engine controller 858. However, it should be appreciated that in other implementations, the accelerator pedal position sensor may communicate directly with the engine controller 858.

The ECU 858 may include a firing sequence generator 862, a torque model module 864, a power train parameter module 866, a firing control unit 869, and an NVH reduction module 868. These units and modules communicate with each other and work cooperatively to control the vehicle.

The firing sequence generator 862 determines the sequence of skips and fires of the cylinders of engine 860. The firing sequence may be generated based on a firing fraction and an output of a delta-sigma converter or may be generated in any appropriate manner, such as those described in U.S. Pat. Nos. 8,099,224, 9,086,020, and 9,200,587, which are incorporated herein by reference in their entirety.

In operation, the firing sequence generator may investigate the fuel efficiency associated with various firing sequences and choose the firing sequence that offers optimal fuel economy while meeting the torque request. In some cases, the powertrain torque may be supplemented or reduced by the power source 857.

The output of the firing sequence generator is a drive pulse signal 852 that may consist of a bit stream, in which each 0 indicates a skip and each 1 indicates a fire for an associated cylinder firing opportunity thereby defining a firing sequence. Additionally, if a recharge event is determined to be required, a −1 can be transmitted. The firing decision associated with any firing opportunity is generated in advance (feedforward) of the firing opportunity to provide adequate time for the firing control unit 869 to correctly configure the engine 860. For example, a firing decision may be to deactivate a cylinder intake valve on a skipped firing opportunity.

The torque model module 864 determines an estimated torque based on the firing sequence and power train parameters determined by the powertrain parameter module 866. These power train parameters may include, but are not limited to, intake manifold absolute pressure (MAP), cam phase angle, spark timing, exhaust gas recirculation level, and engine speed.

The power train parameter module 866 may direct the firing control unit 869 to set selected power train parameters appropriately to ensure that the actual powertrain output substantially equals the requested output. The firing control unit 869 may also actuate the cylinder firings.

The NVH reduction module 868 may use the output of the torque model module 864 to determine an NVH associated with any particular firing sequence and set of power train parameters. In certain cases, the NVH reduction module 868 may (e.g., based on information about the type of spring being utilized, the length of time since the last recharge) direct additional power source 857 to add or subtract torque from the powertrain 859. It should be appreciated that the various modules depicted in FIG. 8 may be combined or configured in a different manner without impacting the overall functionality of the vehicle control system 850.

Torque Profile

In order to determine whether it is necessary to supply a smoothing torque and what that smoothing torque should be, it is advantageous to estimate the overall torque profile of the internal combustion engine. This estimate must be done in an accurate, computationally efficient manner so that the engine torque profile can be predicted in real time. The predicted torque profile may then be used to determine what, if any, smoothing torque is required.

A single cylinder, normalized torque profile can be used to model the overall torque profile of a skip-fire controlled internal combustion engine. Normalized profiles for fired, recharging, and skipped cylinders may be recorded in a look up table. An estimated torque profile for each cylinder can then be determined based on scaling and shifting the normalized torque by factors, such as spark cam phase angle, fueling, and number of times the cylinder has been skipped since the last fire or recharge event. The torque profile can be used, in part, to determine the additional source/sink torque from 857.

The estimated torque profile for all engine cylinders can be summed with the appropriate phasing to obtain the overall engine torque profile. The method described herein can be used to determine the engine torque with a resolution of 0.5° of crank angle, although as described below, courser resolution can often be used to reduce computational time without significantly impacting model accuracy.

Figure 9:
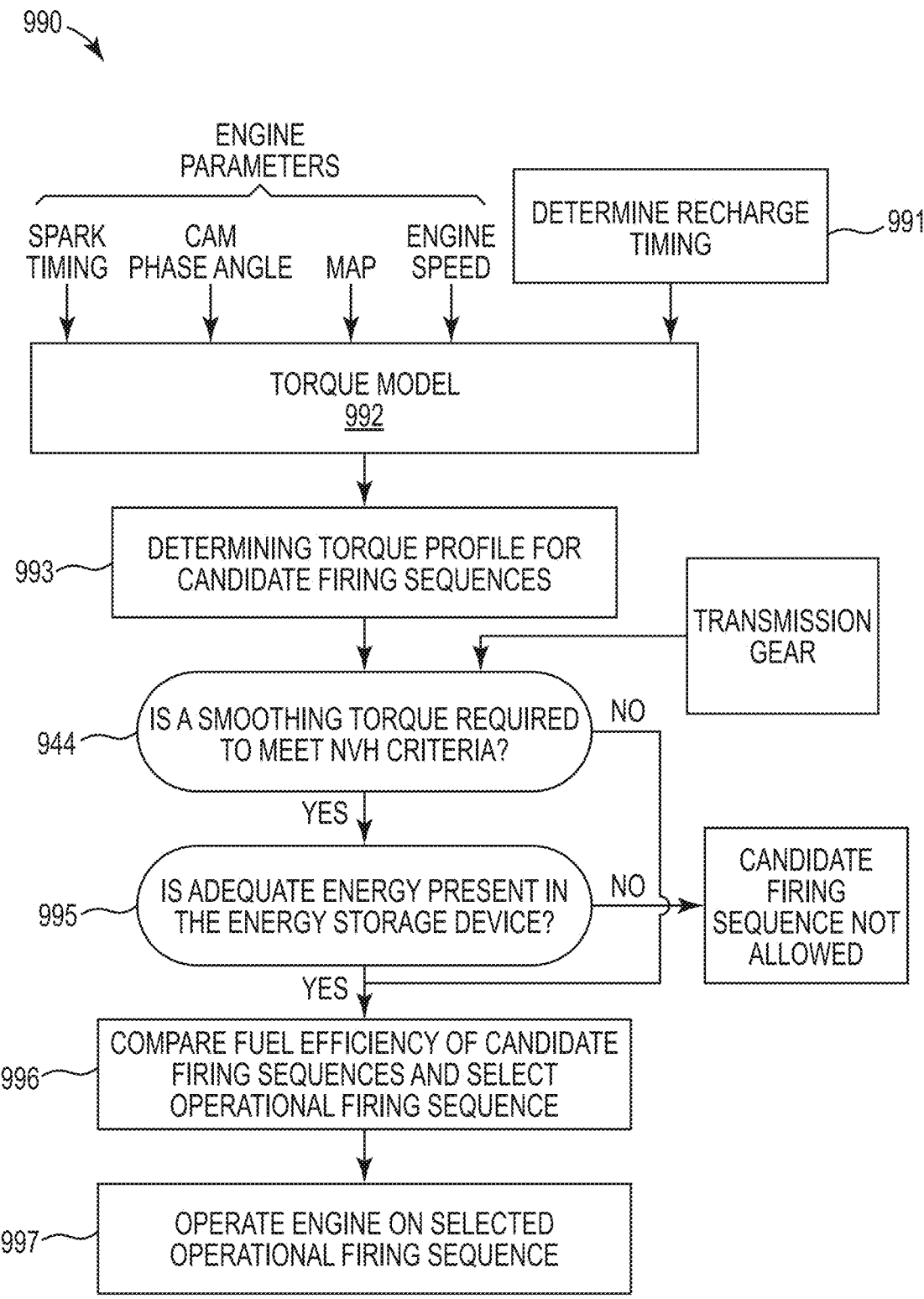
FIG. 9 is a logic diagram of a controller arranged to operate an internal combustion engine that may be used with embodiments of the present disclosure.

FIG. 9 is a logic diagram of a controller arranged to operate an internal combustion engine that can be used with embodiments of the present disclosure. FIG. 9 schematically illustrates a method 990 of determining the most fuel efficient firing sequence according to an embodiment of the present disclosure.

In this method, one or more candidate firing sequences may be generated by the firing sequence generator (e.g., 862 of FIG. 8). The candidate firing sequences may be generated by any known method, such as those described in U.S. Pat. Nos. 8,099,224, 9,086,020, 9,200,587 and 9,200,575 and U.S. patent application Ser. Nos. 14/638,908 and 14/704, 630, which are incorporated herein by reference in their entirety.

Based on the candidate firing sequences and the determination of non-fired (skipped) cylinders, a determination of the timing of recharge events can be made at step 991.

The candidate firing sequences and recharge event timing are input into a torque model 992. Also input into the torque model are various engine parameters, such as spark timing, cam phase angle, engine speed, MAP, fuel, etc.

The torque model 992 determines the torque profile for these recharge events at step 993. An assessment may then be made at step 994 whether a smoothing torque is necessary for a skipping event or a recharge event to provide an acceptable NVH level. The vehicle transmission gear setting may be used in making this assessment.

If a smoothing torque is not required, the flow diagram can proceed to step 996. If a smoothing torque is required, an assessment is made at step 995 whether there is adequate stored or available supplemental energy from additional sources to supply the smoothing torque.

If insufficient supplemental energy is available, that candidate firing sequence cannot be used and another is analyzed to see if it has sufficient energy. If sufficient supplemental energy is available, then the method proceeds to step 996, where the fuel efficiency of the evaluated firing sequences are compared and the firing sequence providing optimum fuel efficiency is selected as the operational firing sequence.

The method then proceeds to step 997, where the engine is operating on the selected operational firing sequence. The method 990 may be repeated for each firing opportunity to determine an optimal firing sequence.

Generating a smoothing torque to compensate for internal combustion engine torque variations can be an application of the previously described torque model. Engine operation variables input to the model may include, for example, cam angle (controlling valve timing), MAP, fuel, engine speed, spark timing, crank angle, firing sequence, and firing fraction. In some implementations, the torque model can generate the instantaneous engine torque profile.

Knowing the torque profile at a particular crank angle, an engine controller may control the smoothing torque needed to be removed from the powertrain, for example, by a generator, or added into the powertrain, for example, by an electric motor. The electric motor/generator may be integrated into a single unit in communication with an electrical energy storage device, such as a battery or capacitor.

The smoothing torque may, for example, be a band pass filtered version of the torque profile generated by 992. Using a band pass filter, the mostly constant frequencies are ignored, as are the higher frequencies. The resultant filtered waveform can then be appropriately delayed to line up with the motor torque, and then subtracted using, for example, an electric motor. Such usage should remove or reduce the low frequency torque disturbances associated with skipping or recharging. Recharging related frequencies are typically lower than the frequency components that arise from the DSF firing pattern and, therefore, it can be important, from an NVH perspective, to reduce or remove them.

Figure 10:
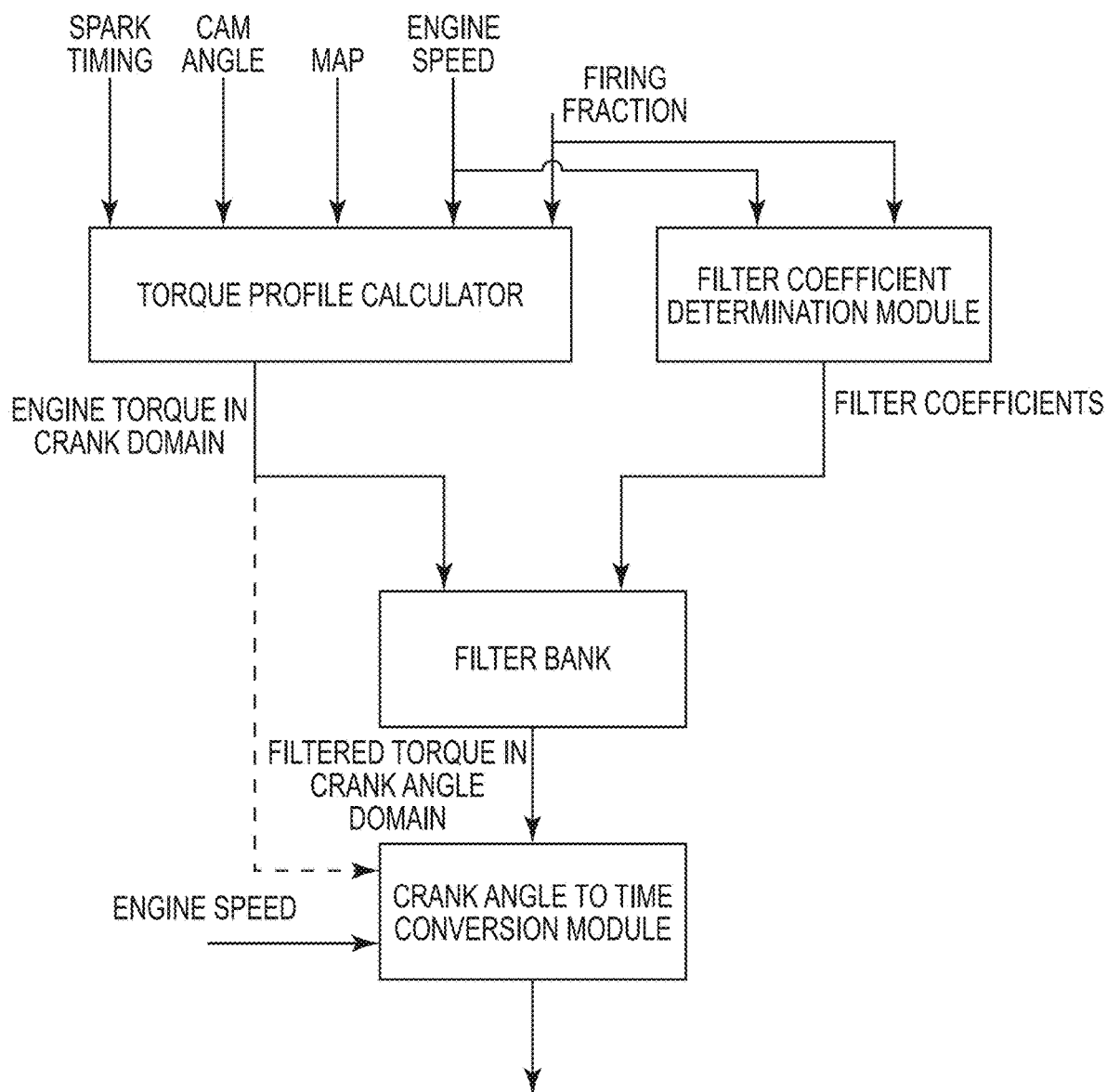
FIG. 10 is a schematic block diagram for a smoothing controller that may be used with embodiments of the present disclosure.

FIG. 10 is a schematic block diagram for a smoothing controller that may be used with embodiments of the present disclosure. FIG. 10 shows an embodiment of a cancellation method which may be utilized to reduce or eliminate skip and/or recharge related distortions.

Inputs to the method include various engine parameters, such as MAP, cam phase angle, engine speed, and spark timing. Another input to the model is the firing fraction or firing sequence, which defines the pattern of upcoming skips and fires. These values are input into an engine torque model as previously described.

The engine speed and firing information may, for example, be input into a filter coefficient determination module. The module determines the filter coefficients for the various DSF orders of interest (for example, the first and second order) to generate the smoothing torque from the torque profile.

In some embodiments, the module may also be used to reduce the NVH of the pattern not including the effect of the recharge.

In some cases, previously used filter coefficients may be used in an upcoming calculation. In such implementations, the future torque profile and filter coefficients can, for example, be input into a filter bank. The filter bank is configured to calculate an appropriate smoothing torque to cancel, for example, low order torque oscillations in the crank angle domain that are related to recharge events. The filter coefficients used in the calculation may be sent to the filter coefficient determination module for use in a subsequent calculation.

The output of the filter bank may be directed to a crank angle to time domain conversion module. This module may use the engine speed and calculated future torque profile to transform the input crank domain signal to an output time domain signal. The conversion may be simply based on average engine speed or may optionally include calculated speed variations based on the calculated torque profile.

Output of the time domain conversion module may be directed to the power electronics unit 344 (see FIG. 3) of the motor/generator. The power electronics unit 344 controls the motor/generator, which adds or subtracts torque from the powertrain as specified by the time domain conversion module signal. The resultant powertrain torque has been smoothed to reduce or remove torque fluctuations from the skipping or recharge event that would cause undesirable NVH.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An engine controller in a vehicle for managing motor torque smoothing, the controller configured to:
   determine a smoothing event time period where a particular one of a number of cylinders that have not been designated to be fired is either skipped or recharged;
   select a periodic disruptive waveform to approximate that is related to a skip or recharge event that is part of the smoothing event time period; and
   determine a first harmonic sinusoid from a group of harmonic sinusoids that reduces the error between an approximated waveform and the disruptive waveform; and
   initiate a supplemental quantity of torque during the smoothing event time period based on the disruption quantity of torque.

2. The engine controller as recited in claim 1, wherein the controller is configured to operate the internal combustion engine at a firing fraction that is less than a value of 1.0, wherein one or more cylinders of the internal combustion engine are not designated to be fired.

3. The engine controller as recited in claim 1, wherein the controller is configured to operate when one or more cylinders of the internal combustion engine are not designated to be fired.

4. The engine controller as recited in claim 1, wherein the controller is configured to determine a phase or a timeframe for utilizing the first harmonic.

5. The engine controller as recited in claim 1, wherein the controller is configured to actuate an additional motor to initiate a supplemental quantity of torque during the smoothing event time period.

6. The engine controller as recited in claim 4, wherein the supplemental quantity of torque changes over time.

7. The engine controller as recited in claim 4, wherein the engine controller is configured to:
   determine a second harmonic sinusoid from a group of harmonic sinusoids that reduces the error between an approximated waveform and the disruptive waveform; and
   determine a timeframe for utilizing the second harmonic.

8. A method for managing motor torque smoothing, the method comprising:
   determining a smoothing event time period where each of a number of cylinders that have not been designated to be fired are either skipped or recharged during operation of the engine, including firing of the cylinders designated for firing;
   selecting a periodic disruptive waveform to approximate that is related to a skip or recharge event that is part of the smoothing event time period; and
   providing a supplemental quantity of torque during the smoothing event time period based on the approximated waveform.

9. The method as recited in claim 8, wherein the method includes determining a second harmonic sinusoid from a group of harmonic sinusoids that reduces the error between an approximated waveform and the disruptive waveform.

10. The method as recited in claim 8, wherein the method includes determining a timeframe for utilizing the second harmonic.

11. The method as recited in claim 10, wherein the method includes determining a number of skip or recharge events for each cylinder within the smoothing event time period.

12. The method as recited in claim 8, wherein the method includes forming an approximated waveform that includes a DC term.

13. The method as recited in claim 12, wherein the method includes forming an approximated waveform that combines the DC term and at least one of the first harmonic sinusoid and second harmonic sinusoid.

14. The method as recited in claim 12, wherein the method includes forming an approximated waveform that includes at least one of the first harmonic sinusoid and second harmonic sinusoid.

15. An engine control system in a vehicle for managing motor torque smoothing, the system comprising:
   an internal combustion engine that provides power to a drivetrain of a vehicle;
   an additional power source that provides supplemental power to the drivetrain; and
   an engine controller configured to:
      determine a smoothing event time period where each of a number of cylinders that have not been designated to be fired are either skipped or recharged during operation of the engine, wherein operation of the engine includes firing of the cylinders designated for firing;
      select a periodic disruptive waveform to approximate that is related to a skip or recharge event that is part of the smoothing event time period;
      determine a first harmonic sinusoid from a group of harmonic sinusoids that reduces the error between an approximated waveform and the disruptive waveform;

and
- initiate actuation of the additional power source to supply a supplemental quantity of torque based on the approximated waveform.

16. The system as recited in claim 15, wherein the supplemental quantity of torque includes at least one of positive and negative torque values.

17. The system as recited in claim 16, wherein the supplemental quantity of torque is supplied during a period of the periodic disruptive waveform.

18. The system as recited in claim 16, wherein the supplemental quantity of torque is supplied after a period of the periodic disruptive waveform.

19. The system as recited in claim 15, wherein for each of the cylinders that have not been designated to be fired, the engine controller selects a spring mode from the group including: low pressure exhaust spring mode, air spring mode, and high pressure exhaust spring mode.

20. The system as recited in claim 19, wherein if air spring mode or high pressure exhaust spring mode is selected, then one or more smoothing event time periods are determined.

* * * * *